(12) United States Patent
Davis

(10) Patent No.: US 7,106,971 B1
(45) Date of Patent: Sep. 12, 2006

(54) SYSTEM AND METHOD FOR OPTICAL WIRELESS COMMUNICATION

(75) Inventor: Christopher C. Davis, Bowie, MD (US)

(73) Assignee: University of Maryland, College Park, MD (US)

( * ) Notice: Subject to any disclaimer, the term of this patent is extended or adjusted under 35 U.S.C. 154(b) by 613 days.

(21) Appl. No.: 10/018,957

(22) PCT Filed: Jun. 30, 2000

(86) PCT No.: PCT/US00/18200

§ 371 (c)(1),
(2), (4) Date: Dec. 27, 2001

(87) PCT Pub. No.: WO01/06663

PCT Pub. Date: Jan. 25, 2001

Related U.S. Application Data

(60) Provisional application No. 60/141,587, filed on Jun. 30, 1999.

(51) Int. Cl.
*H04B 10/00* (2006.01)
(52) U.S. Cl. ............................. 398/125; 398/121
(58) Field of Classification Search ........ 398/118–131, 398/96
See application file for complete search history.

(56) References Cited

U.S. PATENT DOCUMENTS

| | | | |
|---|---|---|---|
| 4,809,257 A | 2/1989 | Gantenbein et al. | 370/4 |
| 5,515,438 A | 5/1996 | Bennett et al. | 380/21 |
| 5,557,443 A | 9/1996 | Nakamura et al. | 359/142 |
| 5,675,648 A | 10/1997 | Townsend | 380/21 |
| 5,737,366 A | 4/1998 | Gehlot | 375/238 |
| 5,757,912 A | 5/1998 | Blow | 380/21 |
| 5,793,509 A | 8/1998 | Proctor et al. | 359/136 |
| 5,917,638 A | 6/1999 | Franck et al. | 359/181 |
| 6,043,918 A * | 3/2000 | Bozzay et al. | 398/121 |
| 6,122,084 A * | 9/2000 | Britz et al. | 398/131 |
| 6,137,609 A * | 10/2000 | Scheps | 398/125 |
| 6,278,537 B1 * | 8/2001 | Miyamori | 398/119 |

OTHER PUBLICATIONS

Fante, "Electromagnetic Beam Propagation in Turbulent Media," *Proceedings of the IEEE*, vol. 63, No. 12, Dec. 1975, pp. 1669-1692.

Tatarski, "Wave Propagation in a Turbulent Medium," Translated from the Russian by R. A. Silverman, *Institute of Mathematical Sciences, New York University*, Copyright, 1961, pp. v, xi-xiv, and 58-188.

Yura et al., "Optical Scintillation Statistics for IR Ground-To-Space Laser Communication Systems," *Applied Optics*, vol. 22, No. 21, Nov. 1, 1983, pp. 3353-3358.

(Continued)

*Primary Examiner*—Agustin Bello
(74) *Attorney, Agent, or Firm*—Sterne, Kessler, Goldstein & Fox P.L.L.C.

(57) ABSTRACT

A system and method for optical wireless communication with fading resistance. A delayed diversity approach reduces fading significantly. Data is sent in a set of light signals (also called diverse light signals) which each have a different polarization and/or a different wavelength. The diverse light signals are also temporally different in that they are transmitted in a delayed fashion with respect to one another. In this way, each light signal is carried over a different, uncorrelated "channel" through the atmosphere. At a receiver, original data in each received light signals is temporally adjusted and combined into a single output data signal. The accuracy of each bit in the output data signal is then due to the reception of the combined diverse light signals. In this way, even if fading occurs in one channel (effecting one diverse light signal), a combined output data signal can still be generated at relatively high accuracy from the original data carried in one or more of the other diverse light signals.

14 Claims, 23 Drawing Sheets

OTHER PUBLICATIONS

Christopher C. Davis et al., "The Effect of Atmospheric Turbulence on Bit-Error-Rate in an On-Off Keyed Optical Wireless System"; Reprinted from Free-Space Laser Communication and Laser Imaging; Proceedings of SPIE vol. 4489; pp. 126-136, 2002.

Sugianto Trisno et al.; "Delayed diversity for fade resistance in optical wireless communications through turbulent media"; Optical Transmission Systems and Equipment for WDM Networking III, Proc. SPIE 5596, pp. 385-393; 2005.

Sugianto Trisno et al.; "Characterization of time delayed diversity to mitigate fading in atmospheric turbulence channels"; paper to be published in Proceedings of SPIE, presented at SPIE San Diego; 10 pages; Aug. 2005.

* cited by examiner

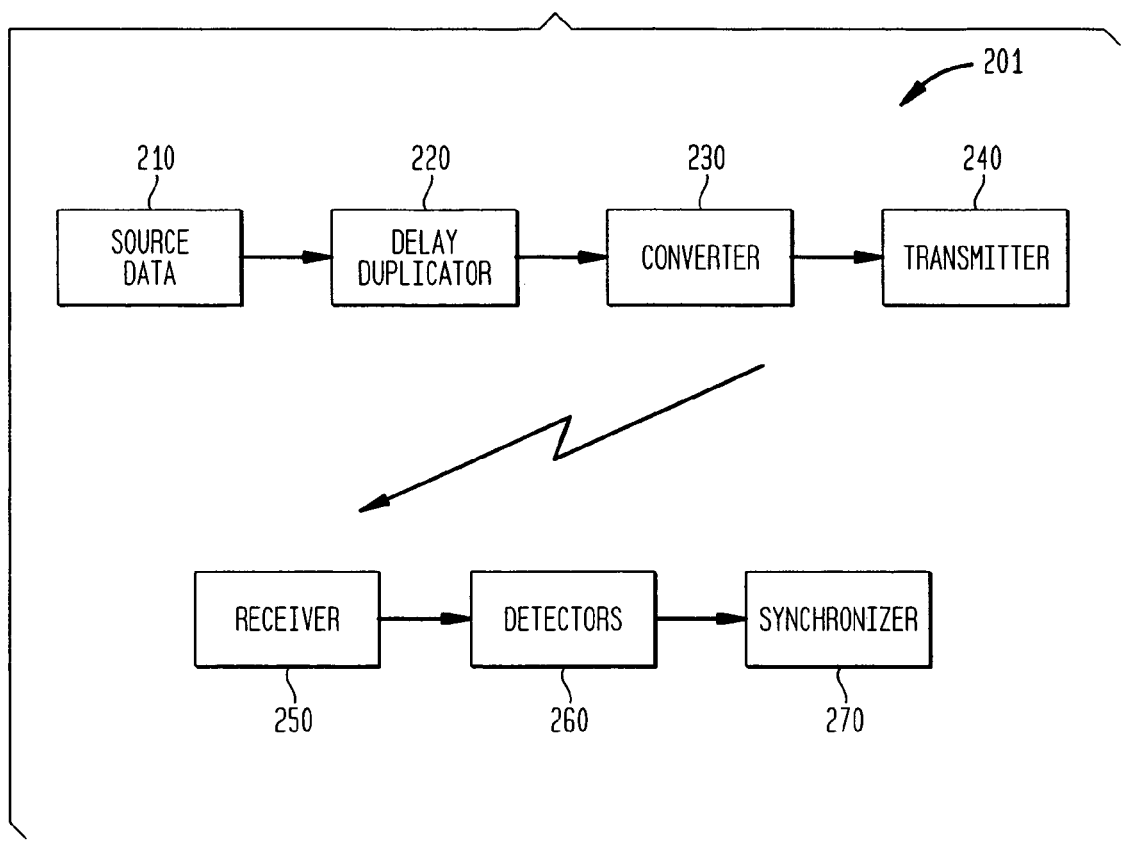

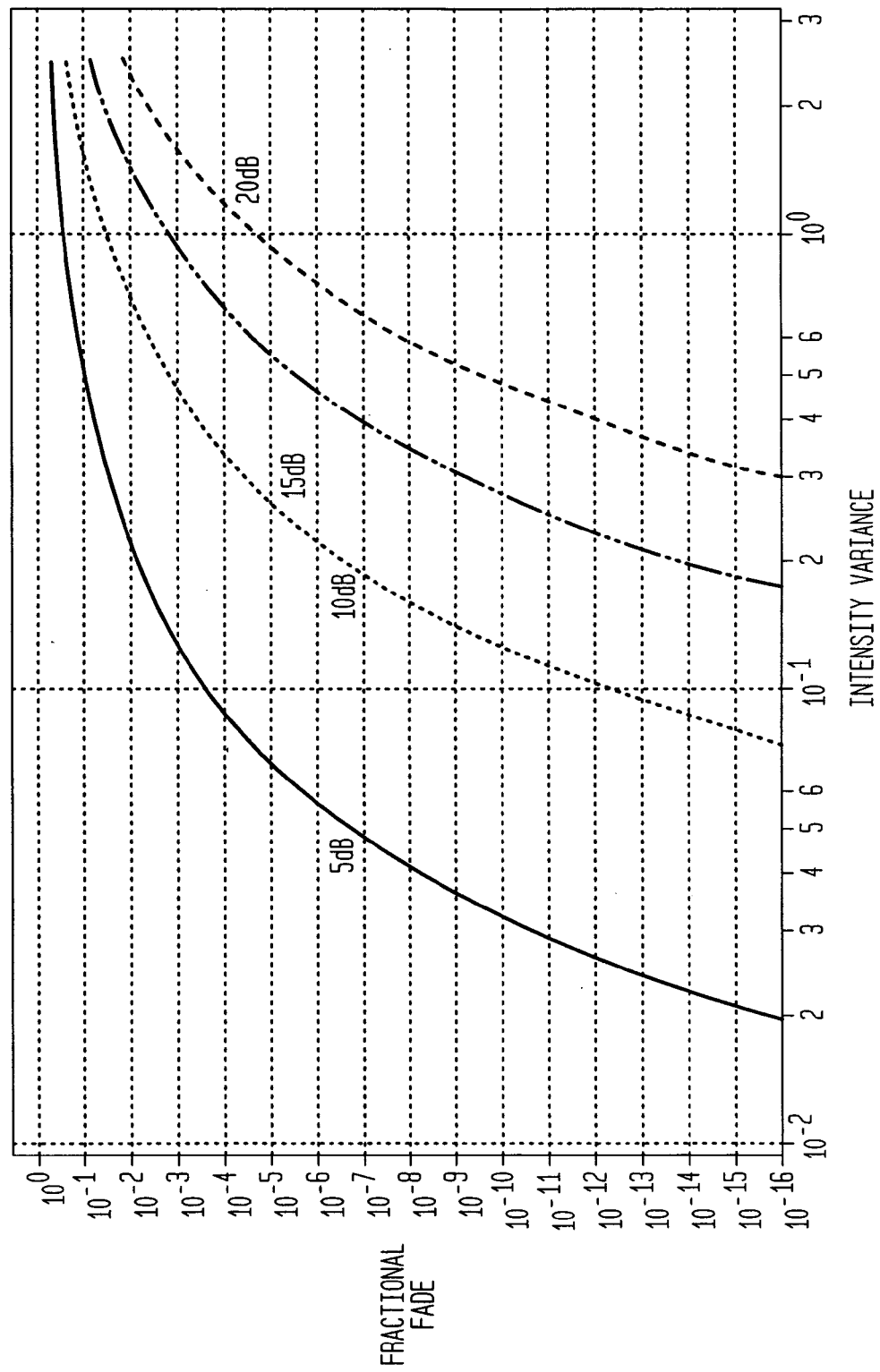

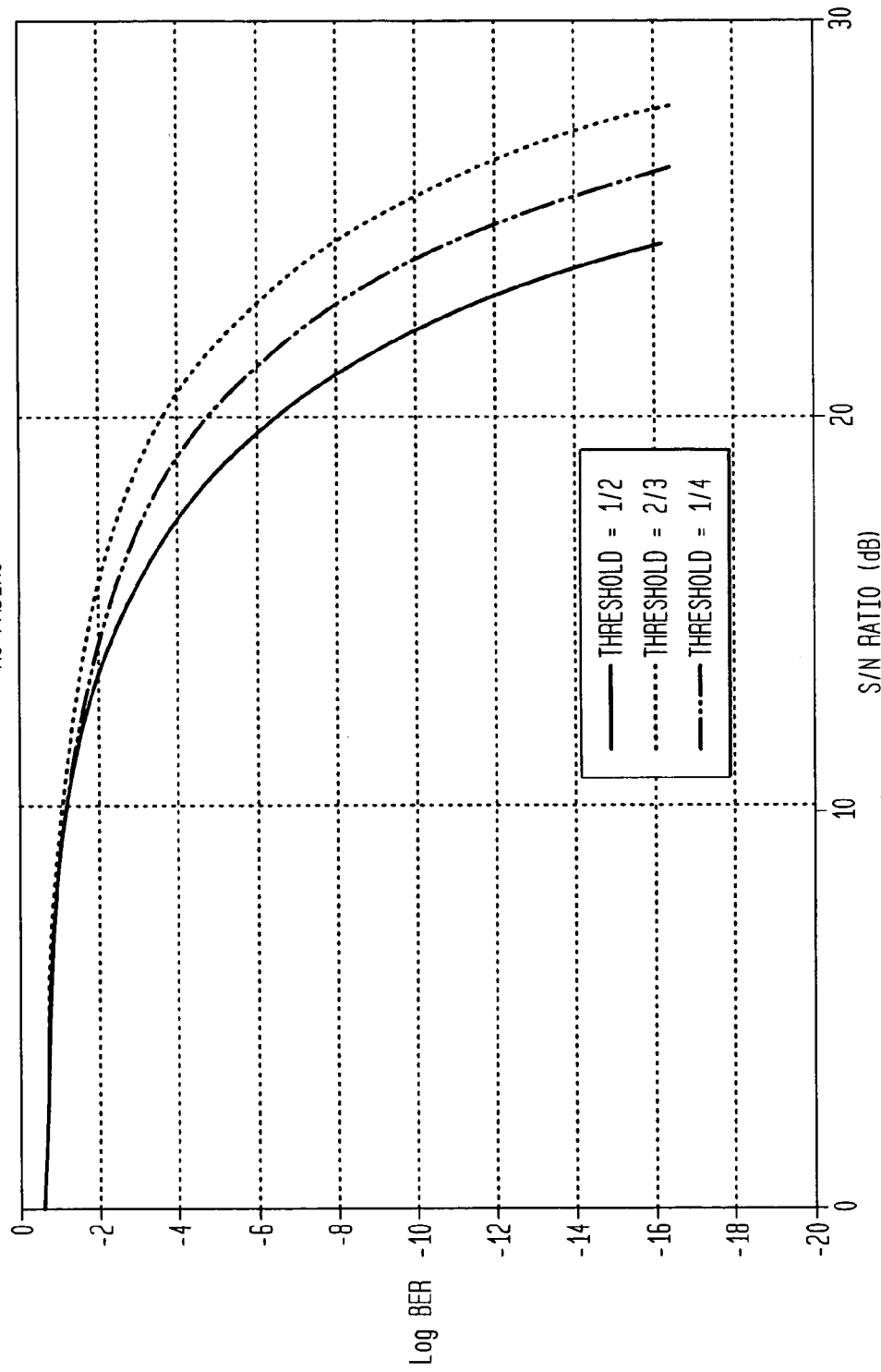

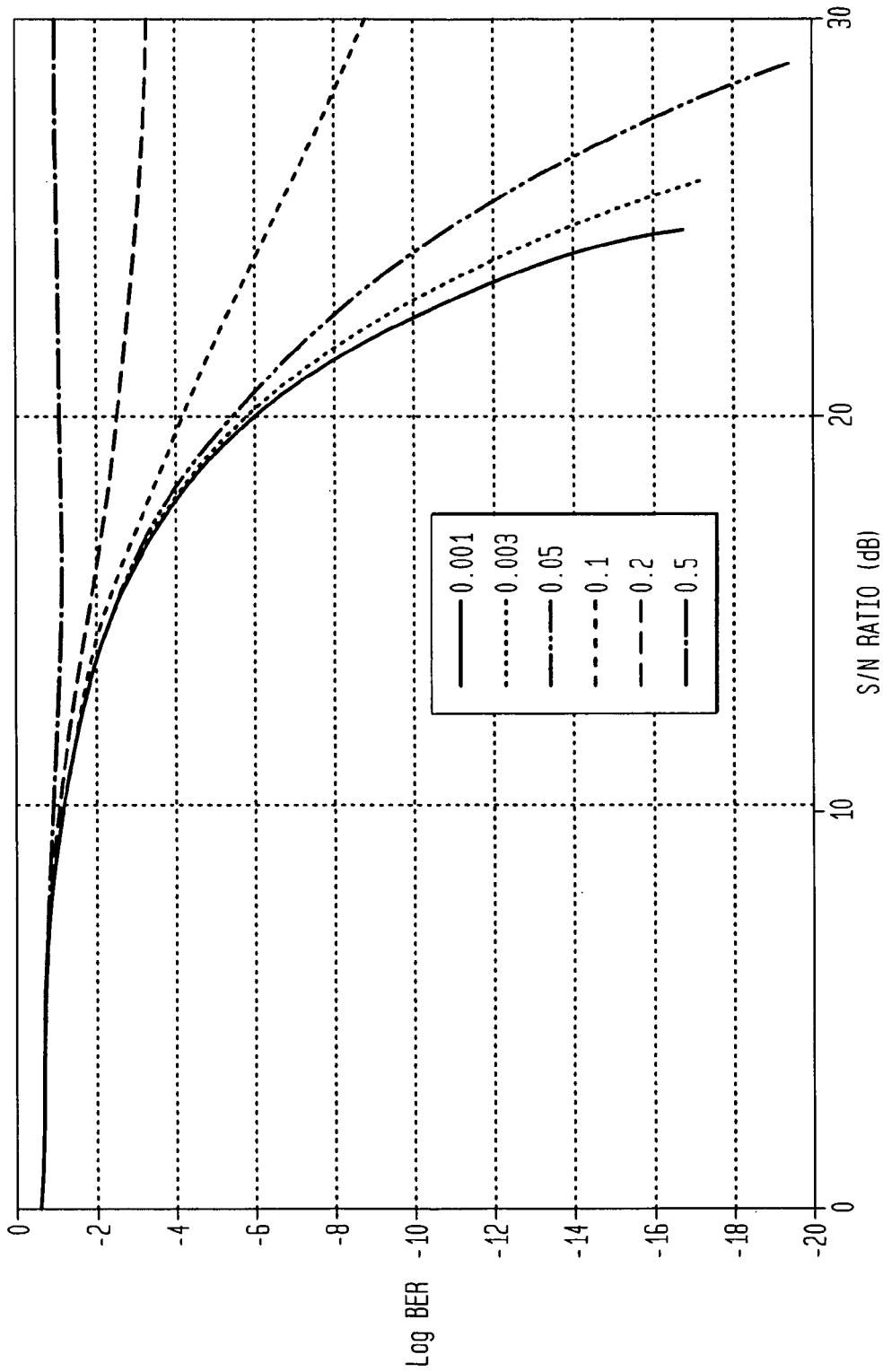

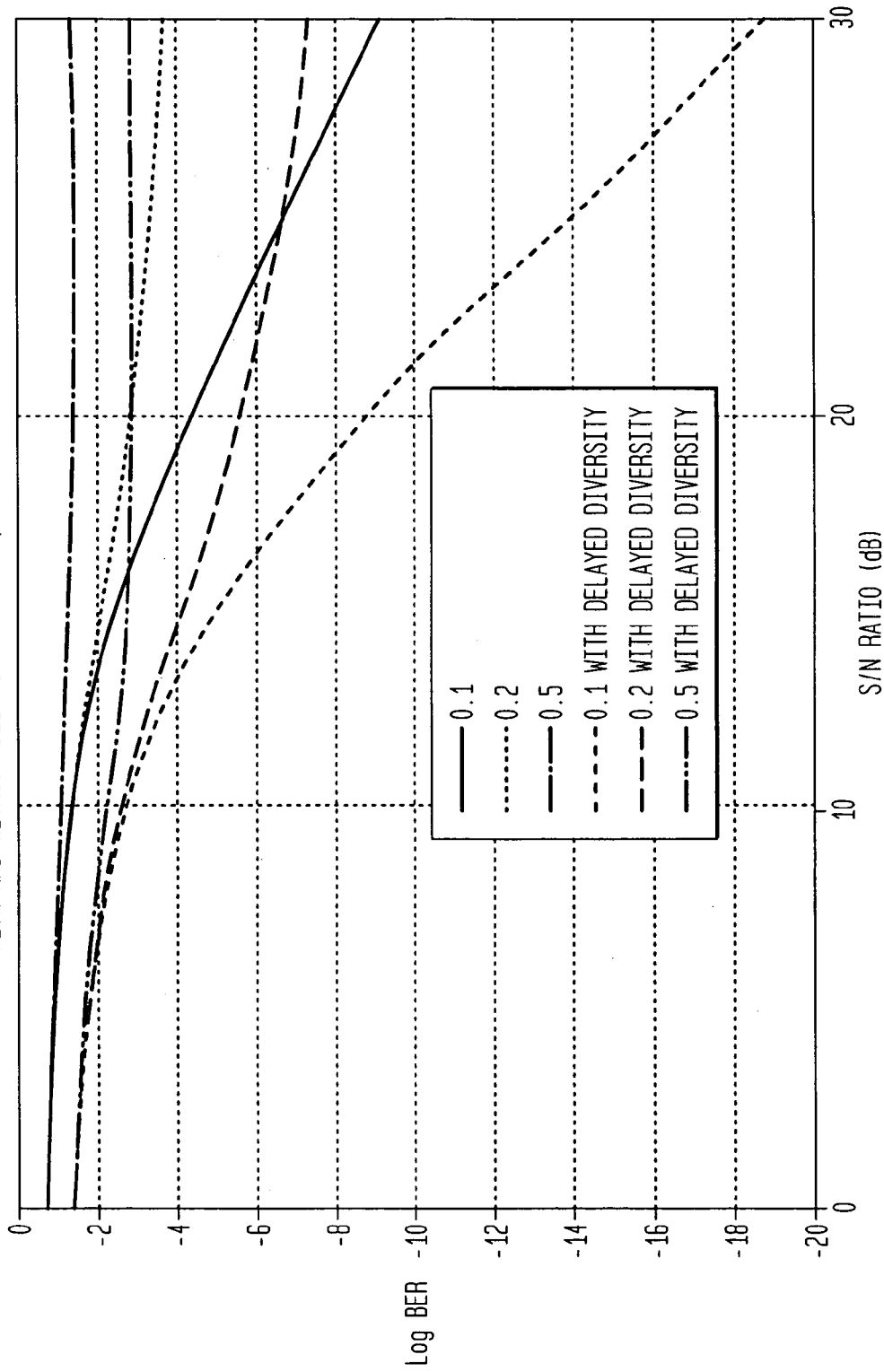

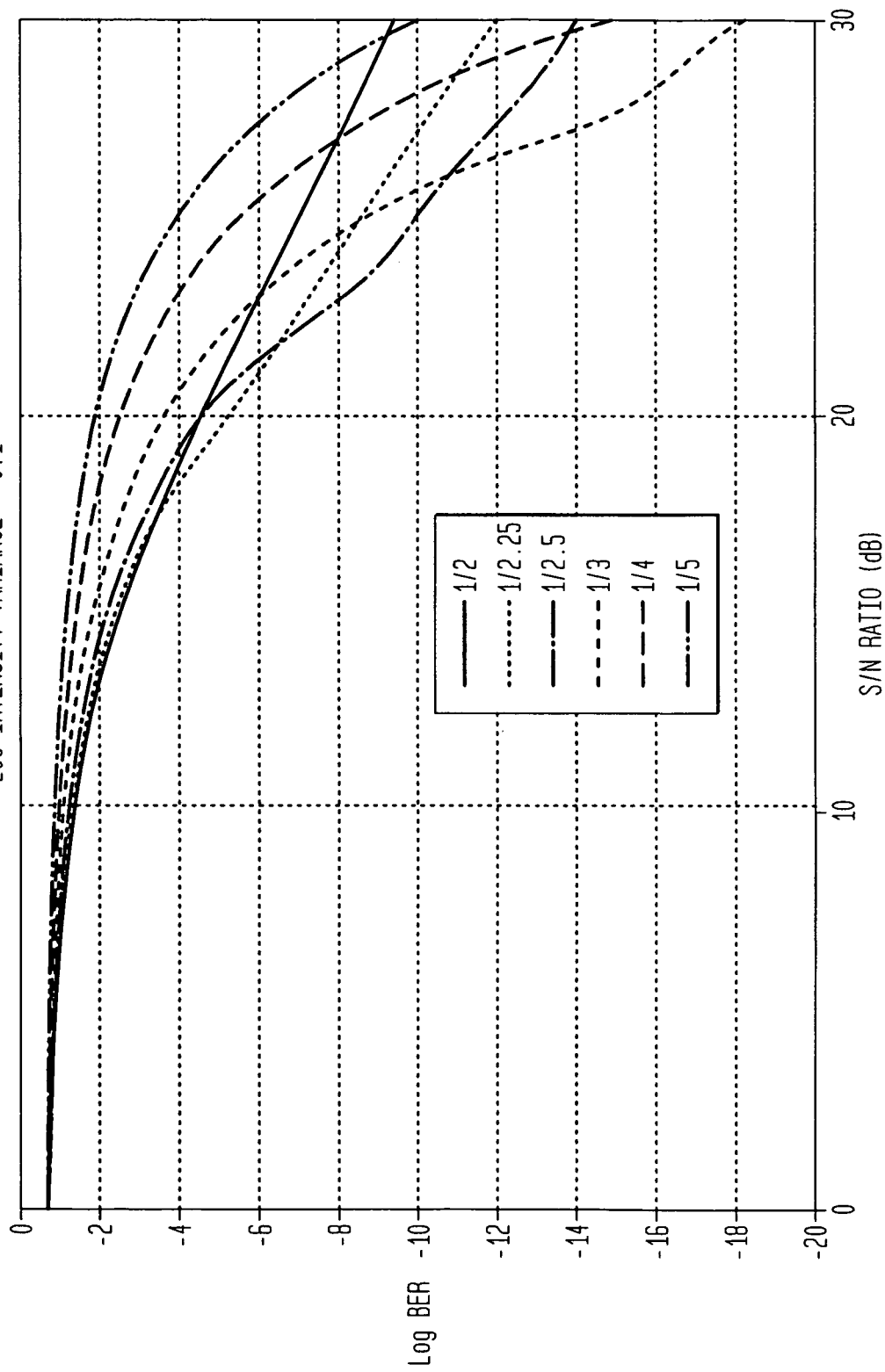

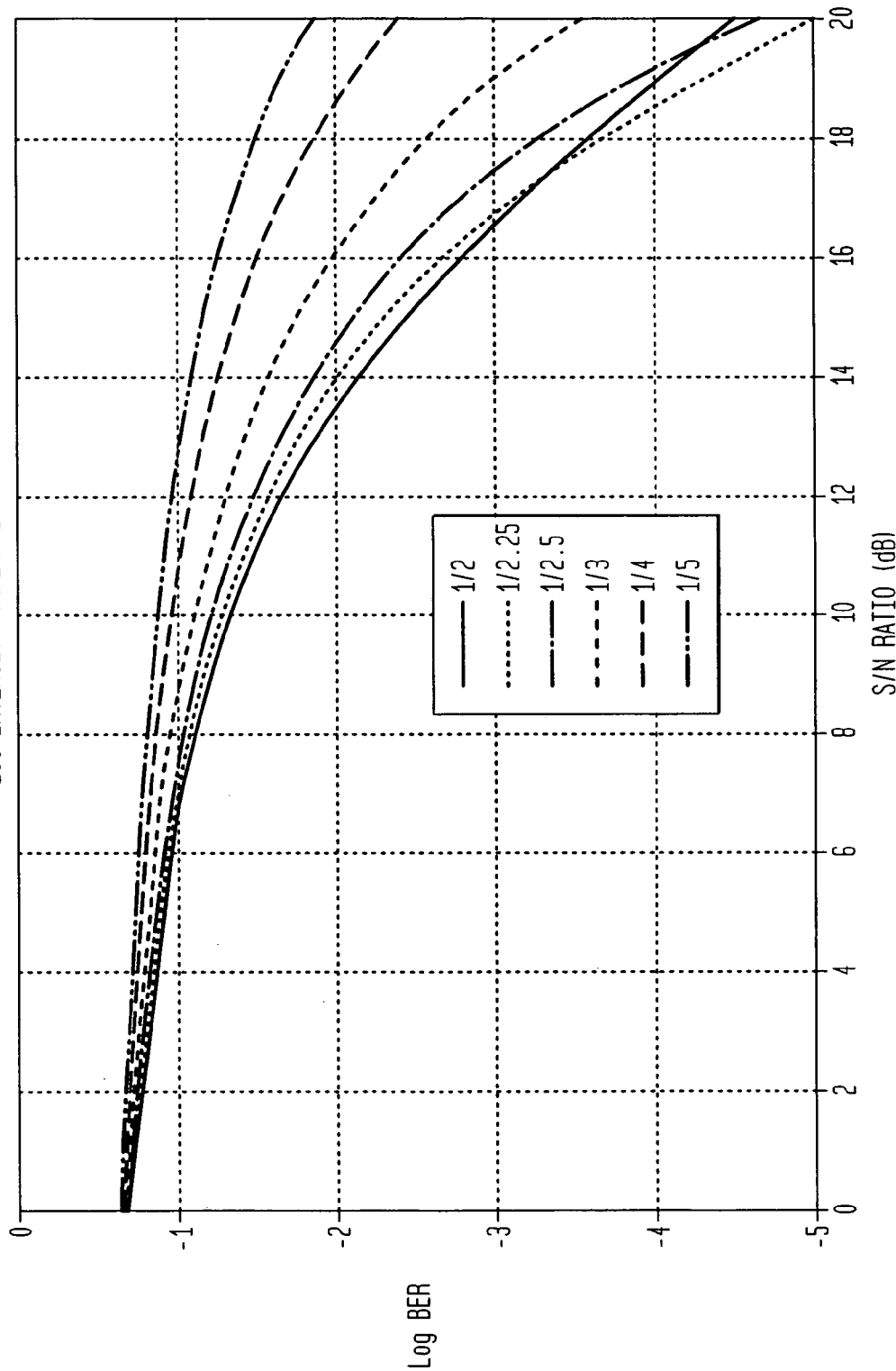

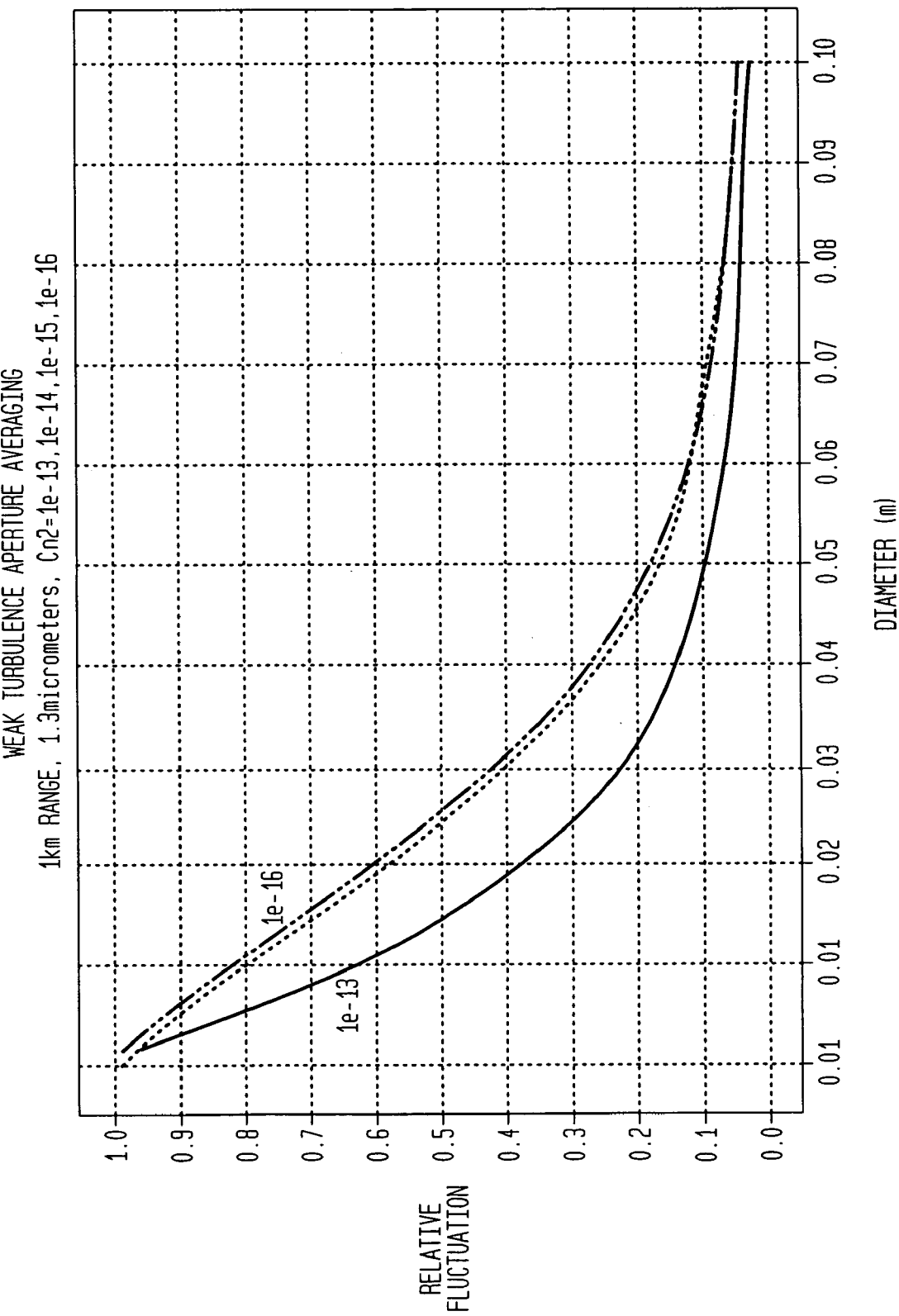

STRONG TURBULENCE APERTURE AVERAGING
1km RANGE, 1.3micrometers, Cn2=1e-12,1e-13,1e-14

SYSTEM AND METHOD FOR OPTICAL WIRELESS COMMUNICATION

This application claims the benefit of priority to U.S. Provisional application Ser. No. 60/141,587, filed Jun. 30, 1999, which is hereby incorporated by reference in its entirety.

STATEMENT AS TO RIGHTS TO INVENTIONS MADE UNDER FEDERALLY SPONSORED RESEARCH AND DEVELOPMENT

Part of the work performed during development of this invention utilized U.S. Government finds (NSA Contract No. MDA 904 97 C 3570). The U.S. Government has certain rights in this invention.

BACKGROUND OF THE INVENTION

1. Field of the Invention

The present invention relates to optical communication.

2. Related Art

Optical communication is in increasing demand. In optical communication, digital data is carried in an optical signal. The digital data consists of bits of information (e.g., "1s" and "0s"). Such data is transmitted in an optical signal using modulation. Examples of modulation which can be used in optical communication are modulation based on amplitude, frequency, phase, polarization, or a combination thereof.

Communication between a source node and destination node is conducted through one or more links. A link can include logical and/or physical layers to support data transfer. An optical wireless communication system includes a physical layer with an optical wireless link. An optical wireless link can be any optical link through a turbulent medium such as, the atmosphere. For example, an optical wireless link can include, but is not limited to, an optical line of sight (LOS) link that uses a transmitter, such as, a laser or light-emitting diode (LED). Data is transmitted on the emitted beam using some form of amplitude, frequency, phase, or polarization modulation, or a combination thereof.

Optical wireless links are increasingly popular as they can provide relatively low cost, high performance communications over short distances—typically up to a few kilometers at sea level. Other advantages of optical wireless links are: no FCC spectrum allocation is required for their use, they have a high degree of physical security because of the directionality of the transmitted beam, the communication channel infrastructure exists with a low probability of detection, and easy set-up and removal. Optical wireless links have a further advantage in that no communication channel infrastructure such as, optical fibers, needs to be installed. Of course, an optical wireless link can be a separate stand alone path between a source node and destination node or it can be combined with any other type of conventional communication link, such as, a fiber link, RF link, or wired link.

In an optical wireless link, the optical beam passes from transmitter to receiver along a path through the atmosphere. Since the atmosphere is a turbulent medium the optical wavefronts are distorted in passing from transmitter to receiver. Such fluctuations in received power are unpredictable and can result in the loss of data (that is, "1" bits can be detected as "0" bits). This fluctuation problem is known as fading. Because of the potential for fading, there is some probability that the fluctuating received intensity will fall below a threshold value and lead to unacceptable bit error rates on an optical wireless link.

Different approaches can be used to reduce fading. One approach is to simply re-send packets of data. In this case, if data does not arrive satisfactorily, then it is re-transmitted. Unfortunately, this scheme may significantly reduce the overall data transfer rate and increase system complexity. Other approaches include the following:

(1) Increasing the transmitter power, which is not always possible because of electrical power requirements and eye-safety issues;

(2) Increasing the effective size of the receiver, which may not always be possible because fast optical receivers are generally of small size, and keeping light collected over an aperture (lens, mirror, or non-imaging light collector) focused on a small detector may require active tracking, or over-filling of the detector;

(3) Introducing spatial diversity, which amounts to sending several optical beams from transmitter to receiver along generally parallel paths, which are hopefully uncorrelated with regard to turbulent effects in the beams traveling along each path; and (4) Introducing phase scrambling at the transmitter, which can reduce the degree of scintillation at the receiver.

These approaches, however, have limitations such as complexity or additional cost. Also, despite all these approaches, at some level fading will remain.

What is needed is a method and system for optical wireless link communication that reduces fading.

SUMMARY OF THE INVENTION

The present invention provides a system and method for optical wireless communication with fading resistance. A delayed diversity approach is used to reduce fading significantly. Data is sent in a set of light signals (also called diverse light signals) which each have a different polarization and/or a different wavelength. The diverse light signals are also temporally different in that they are transmitted in a delayed fashion with respect to one another. In this way, each light signal is carried over a different, uncorrelated "channel" through the atmosphere. At a receiver, original data in each received light signals is temporally adjusted and combined into a single output data signal.

The accuracy of each bit in the output data signal is then due to the reception of the combined diverse light signals. In this way, even if fading occurs in one channel (effecting one diverse light signal), a combined output data signal can still be generated at relatively high accuracy from the original data carried in one or more of the other diverse light signals. The other one or more light signals pass through the different respective temporal channels in the atmosphere and therefore are not likely to experience the same fading condition.

In one embodiment, a method for optical wireless communication is provided. The method includes the steps of receiving a source data signal having data, creating a set of temporally distinguishable transmission signals, and converting the set of temporally distinguishable transmission signals to obtain corresponding a set of temporally distinguishable light signals. Each light signal has a modulation representation of the data from the source data signal. In this way, the set of light signals carrying multiple copies of the data can pass through uncorrelated channels in a turbulent medium. A transmitting step is added to transmit the set of temporally distinguishable light signals in a single output transmission beam through the turbulent medium.

At a receiving end of an optical wireless link, the following steps are performed. The method includes receiving the single output transmission beam after it has passed through a turbulent medium; detecting temporally distinguishable light signals within the received single output transmission beam to obtain corresponding temporally distinguishable data signals; temporally adjusting each temporally distinguishable data signals obtained in the detecting step; and logically evaluating bits in each of said temporally adjusted temporally distinguishable data signals to obtain a single output data signal.

In another embodiment, a system for optical wireless communication is provided. The system includes means for receiving a source data signal having data; means for creating a set of temporally distinguishable transmission signals; and means for converting the set of temporally distinguishable transmission signals to obtain corresponding a set of temporally distinguishable light signals, each light signal having a modulation representation of the data from the source data signal; whereby, the set of light signals can pass through uncorrelated channels in a turbulent medium. The system can also include a transmitter means for transmitting the set of temporally distinguishable light signals in a single output transmission beam through a turbulent medium.

In an embodiment at a receiver side, the system can include means for receiving the single output transmission beam after it has passed through a turbulent medium; means for detecting temporally distinguishable light signals within the received single output transmission beam to obtain corresponding temporally distinguishable data signals; means for temporally adjusting each obtained temporally distinguishable data signal obtained; and means for logically evaluating bits in each of said temporally adjusted temporally distinguishable data signals to obtain a single output data signal.

Further embodiments include communications systems that utilize amplitude modulation, polarization modulation, frequency modulation, or any combination of these or other modulation techniques.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

In the drawings:

FIG. 2 is an illustration of a communications system according to the present invention.

FIGS. 7A–7P are diagrams related to theoretical discussion and/or test results according to example implementations of the present invention.

FIG. 7A is a diagram plotting the fraction of the time that a fade of a given depth will occur for various levels of intensity variance according to one example fading model.

FIG. 7B is a plot of BER as a function of threshold setting.

FIGS. 7C, 7D, 7E, and 7F show calculations of BER for different levels of intensity variance, and for different settings of the threshold setting for detection of a "one".

FIGS. 7O and 7P show aperture averaging calculations for the following optical link conditions: a 1.3 µm laser and a 1 km range. FIG. 7O shows aperture averaging for three different degrees of "weak" turbulence. FIG. 7P shows aperture averaging for three different degrees of "strong" turbulence.

Figure 1A:
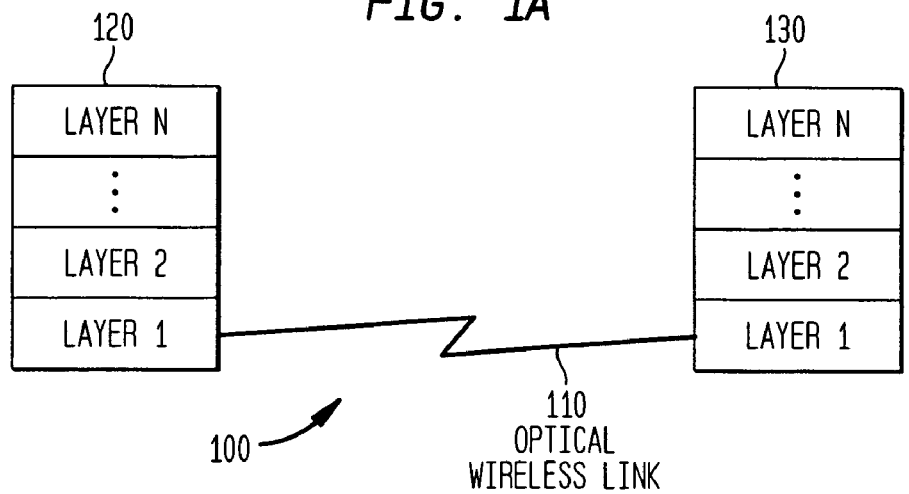
FIG. 1A is an illustration of the relationship between the environment in which the present invention operates and conventional layers of communications systems.

The present invention will now be described with reference to the accompanying drawings. In the drawings, like reference numbers indicate identical or functionally similar elements. Additionally, the left-most digit(s) of a reference number typically identifies the drawing in which the reference number first appears.

DETAILED DESCRIPTION OF THE PREFERRED EMBODIMENTS

Overview

A "delayed-diversity" communication technique is provided that reduces fading. This technique takes advantage of the changes in the characteristics of the atmospheric path between the transmitter and the receiver. According to the present invention, a set of delayed diversity signals are generated and used to carry information from an original data signal over an optical wireless link. By introducing a delay during a multiple data stream transmission, the probability of simultaneous errors in the streams is markedly reduced. Although the delayed diversity scheme introduces a latency into communication over an optical wireless link, data arrives continuously at the receiver. This latency is generally of no consequence for data transfer and can be managed to be short enough so as to be unnoticeable during voice communication.

The set of diverse lights signals can be made diverse, that is, distinguishable from one another based on a polarization and/or wavelength. Such polarization and wavelength diversity can be used separately or combined in various ways: one or more wavelengths, each with up to two orthogonal polarization states (e.g., s and p polarization) can be used. Two orthogonal polarization states can be used to provide clock recovery by transmitting, for example, all the "ones" in a bit stream vertically polarized and all the "zeros"

horizontally polarized. Various error-correcting codes can be incorporated into two or more channels (polarization plus wavelength diversity) to provide improvements in performance.

In one embodiment, a full duplex system incorporating polarization diversity is implemented. A receiver/transmitter (also called a transceiver) module sends one polarization and receives the same polarization, an orthogonal polarization, or both. Different wavelengths, for example UV, visible, near-infrared, and middle-infrared can be used to overcome atmospheric attenuation caused by scatting (aerosols, fog, rain, etc) and absorption (pollutants). In one example, different infra-red wavelengths in common infrared windows such as 1.3 micron and 1.5 micron windows are used.

For example, according to the present invention, a data stream (represented as a sting of "ones" and "zeros" in an on-off-keyed (OOK) optical beam) is transmitted in orthogonal polarization states, separate wavelengths, or both, but with an appropriate time delay between two channels. The received data streams are interleaved (that is synchronized and combined) after reintroduction of the same delay into the opposite channel. A significant reduction in fractional fade time results. Since atmosphere turbulence has a power spectrum roughly below 1 kHz, with predominant frequencies in the tens of Hz range, over times of 10 milliseconds (ms) or longer the turbulence effects along the path of an optical beam are uncorrelated.

Example Environment

The present invention relates to optical wireless communication. The present invention is described with respect to one example environment of optical wireless communication provided in a computer networking environment.

FIG. 1A is a diagram of an optical wireless communication system 100 that includes an optical wireless link 110 in an example networking environment of the present invention. Communication including data transfer is carried out between two nodes 120, 130. Each node 120, 130 includes a number of layers 1 to N, where N is an integer equal to or greater than 1. The layers are used to support to functionality required to carry out different services and protocols.

In one embodiment, layer 1 is the physical layer. Layer 1 includes the hardware in the present invention, including, a transmitter and/or receiver as described further below. The other higher layers 2 through N can include, but are not limited to, layers supporting packet-switched communication such as, any one or more of a network interface layer, Internet layer, Transport layer, and an Application layer. In one example, a suite of protocols, such as, Transmission Control Protocol/Internet protocol (TCP/IP) as used in the Internet can be included. Communication according to other standards and protocols can be used, including but not limited to, Ethernet, Asynchronous Transfer Mode(ATM), Frame Relay, CDMA, etc.

Figure 1B:
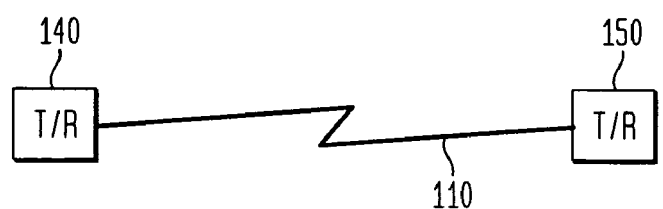
FIG. 1B is a diagram of a bi-directional full-duplex optical wireless communication system including an optical wireless link in an example of the present invention.
Figure 1C:
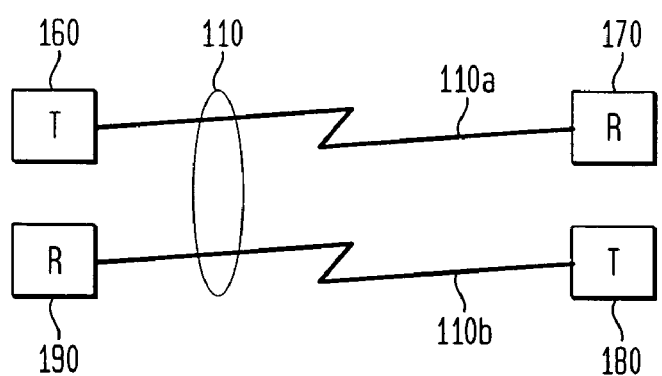
FIG. 1C is a diagram of an optical wireless communication system including two uni-directional optical wireless links in an example of the present invention.

FIGS. 1B and 1C illustrate architectures of hardware in layer 1 according to embodiments of the present invention. FIG. 1B is a diagram of a bi-directional full-duplex optical wireless communication system having a first transceiver 140 at node 120 and a second transceiver 150 at node 130. Each transceiver 140, 150 is coupled to optical wireless link 110. Transceiver 140 can include one or more transmitters and one or more receivers for sending and receiving a set of delayed diversity light signals. Optical wireless link 110 is any portion of an optical communications link that passes light signals through a turbulent medium. In one example implementation, transceiver 140 can be integrated on a single optical-electronic monolithic device to form a compact device. Likewise, transceiver 150 can be integrated on a single optical-electronic monolithic device to form a compact device.

FIG. 1C is a diagram of an optical wireless communication system where optical wireless link 110 includes two unidirectional optical wireless links 110a, 110b. A transmitter 160 transmits a first set of delayed diversity light signals over optical wireless link 110a to a receiver 170. Similarly, a transmitter 180 transmits a first set of delayed diversity light signals over optical wireless link 110b to a receiver 190.

Also, the present invention improves fade resistance and decreases bit error rate for data transfer over optical wireless link 110. In one sense, the present invention represents a hardware solution for improving bit error rate. Any other conventional technique for further improving bit error rate can also be used in nodes 120 and 130, in combination with the present invention. For example any coding technique such as, those involving Reed-Solomon codes, Turbo codes, Viterbi codes, or concatenated codes can be used. Of course, these examples are illustrative and not intended to necessarily limit the present invention.

Description in these terms is provided for convenience only. It is not intended that the invention be limited to application in this example environment. In fact, after reading the following description, it will become apparent to a person skilled in the relevant art how to implement the invention in alternative environments.

Delayed Diversity Optical Wireless Communication Embodiments

FIG. 2 is an illustration of a communications system 201 according to the present invention. Data to be transmitted by communications system 201 is represented as source data 210. Source data 210 can be digital data representative of any desired information. Source data 210 is a return-to-zero signal according to an embodiment of the present invention, though other types of data signals can be used without departing from the scope of the present invention. Source data 210 is processed by a delay duplicator 220 within communications system 201. Delay duplicator 220 receives as an input the source data 210, and produces an output that includes a set of transmission signals. At least one of the set of transmission signals corresponds to the source data itself, while at least another of the set of transmission signals corresponds to the source data delayed a first time, $t_1$. Thus, the set of transmission signals includes at least two transmission signals that can be temporally distinguished from one another. In other words, one of the transmission signals corresponds a delayed version of the other transmission signal in a system that includes two transmission signals. More than two transmission signals can be used, as will be discussed more fully below.

By introducing the delay $t_1$ into one of the transmission signals, the communications system 201 will ultimately transmit the same signal twice, at two different times. The temporal separation between the two transmissions will thus be equal to $t_1$. While a turbulent medium may introduce an error into an optical communication, such a medium is always in flux and so the likelihood of errors at two different times is not generally correlated. Thus, if P(T) is the likelihood of an error at any given time T, then the likelihood of error for the same piece of data in two temporally displaced data signals will approach $P(T)^2$, as long as the two signals are displaced by a sufficient amount of time. So, for example, if the error rate of a particular optical communications channel is a relatively unacceptable $10^{-4}$, the use of a duplicated signal with an appropriate delay can reduce this error rate to the more acceptable level of $10^{-8}$. The present inventor has discovered that with a 1 millisecond delay, the likelihood of error at the same data point in two temporally separated signals begins to diminish significantly. Thus, the delay $t_1$ introduced by the delay duplicator is at least approximately 1 millisecond according to the present invention. Preferably, the delay $t_1$ is between approximately 1 millisecond and approximately 10 milliseconds. More preferably, the present inventor has discovered that the delay $t_1$ should be between approximately 5 and approximately 10 milliseconds. Thus, the delay duplicator 220 produces an output that includes a set of temporally distinguishable transmission signals.

The set of temporally distinguishable transmission signals are converted into optical signals by a converter 230. Such conversion is accomplished through modulation of one or more light sources with the transmission signals resulting in a set of light signals corresponding to the temporally distinguishable transmission signals. Such modulation can include amplitude, frequency, phase, or polarization modulation, or a combination of these. In addition to modulation, one or more division techniques can be used such as two light sources with different frequencies, polarizations, etc. Such a light source can include a laser or LED beam. For example, a 1.3 micron ($\mu$) or a 1.55$\mu$ laser can be used as a light source. The laser can be a pig-tailed laser diode. The laser output can be boosted with an erbium doped fiber amplifier (EDFA) and can be collimated to prevent spreading as would be apparent to one skilled in the relevant art. The laser can be fiber coupled. Other light sources or modulation techniques could be used with departing from the scope of the present invention. For example, different wavelengths such as UV, visible, near-infrared, and middle-infrared can be used to overcome atmospheric attenuation caused by scattering (from aerosols, fog, rain, etc.) as well as by absorption (from, for example, pollutants). Thus, the converter 230 receives the set of temporally distinguishable transmission signals as inputs and produces a set of light signals as outputs.

Transmitter 240 transmits the light signals received from converter 230. Such transmission includes the combination of the light signals from converter 230 into a single light beam. Such combination can be accomplished, for example, through the use of a polarizing beam splitter or a dichroic mirror, or a combination of the two, as will be described more fully below.

After transmission, the light signals are received by a receiver 250. The receiver separates the light beam back into separate light signals. Such separation can also be accomplished, for example, through the use of a polarizing beam splitter, a dichroic mirror, or a combination of the two, as will be described more fully below.

Once separated back into individual light signals, these signals are detected by detectors 260. Detectors 260 convert each light signal back into a received data signal in a manner that would be apparent to one skilled in the relevant art given this disclosure. The detectors 260 thus can include one detector for each light signal to be detected. Thus, the output of detectors 260 is a set of received data signals that correspond to the set of temporally distinguishable transmission signals produced by delay duplicator 220. Ideally, the received data signals would be identical to the transmission signals. However, due to turbulence within the transmission medium, errors may be introduced as a result of fading. Nevertheless, since one of the two transmission signals was delayed, the probability that a single bit was lost in both transmission signals is much less likely than the loss of any bit within one of the transmission signals. Thus, by creating a single output signal from the set of received data signals, the error rate can be significantly reduced. Such a single output signal is generated by synchronizer 270.

Synchronizer 270 receives received data signals from detectors 260. Synchronizer 270 introduces the necessary delays to the received data signals so that they are temporally aligned with one another. For example, if the set of temporally distinguishable transmission signals generated by delay duplicator 220 includes two signals, a first transmission signal without a delay and a second transmission signal with a 3 millisecond delay, then synchronizer 270 introduces a 3 millisecond into the received data signal that corresponds to the first transmission signal. Thus, in this example, both of the received data signals should correspond to the original source data signal with a 3 millisecond delay. Once the appropriate delay or delays have been introduced, the received data signals are combined to produce a single output data signal. The synchronizer can use logic, for example an OR gate, to combine the signals. It is helpful to again consider the nature of the errors that to which the present invention is directed. Light transmission through a turbulent medium is susceptible to fading. Thus, a 1 (or high signal) is lost when the transmitted light fades below the minimum power required for the receiver. A lost 1 will thus be received as a 0. By temporally aligning the received signals and combining them with an OR gate, a bit that is a 1 in a first of the received data signals and a 0 in a second of the received data signals, will be represented as a 1 in the output data signal, since any reception of a 1 indicates that the signal was present. By combining a delayed signal and a non-delayed signal, the error rate due to fading can be significantly reduced.

While the communications system 201 of FIG. 2 has been described in terms of the use of a set of temporally distinguishable transmission signals including a delayed and a non-delayed data signal, more that two such transmission signals could be used. For example, the set of transmission signals could include a non-delayed transmission signals and three additional transmission signals delayed at times $t_1$, $t_2$, and $t_3$, respectively. Such delay times could be 1, 2, and 3 milliseconds, respectively. Other delay times could be used without departing from the scope of the present invention. For example, the times could be 3, 6, and 9 milliseconds; 1, 5, and 10 milliseconds, or any other appropriate delay times. Moreover, while examples have now been given which include 2 and 4 temporally distinguishable transmission signals, any number of temporally distinguishable delay signals could be used without departing from the scope of the present invention.

As described above, the communications system 201 of FIG. 2 reduces error in an optically transmitted signal by taking advantage of the non-correlation of error probability over a communications channel at two points in time separated by at least about 1 millisecond. While such a system with its associated method, discussed below, serves to reduce errors, other conventional error reduction techniques can also be used within such a system and method without departing from the scope of the present invention. For example, the use of packet-switching in a duplex link as well as coding techniques can also be used with the present invention to further reduce error, as would be apparent to one skilled in the relevant art given this description.

Figure 3A:
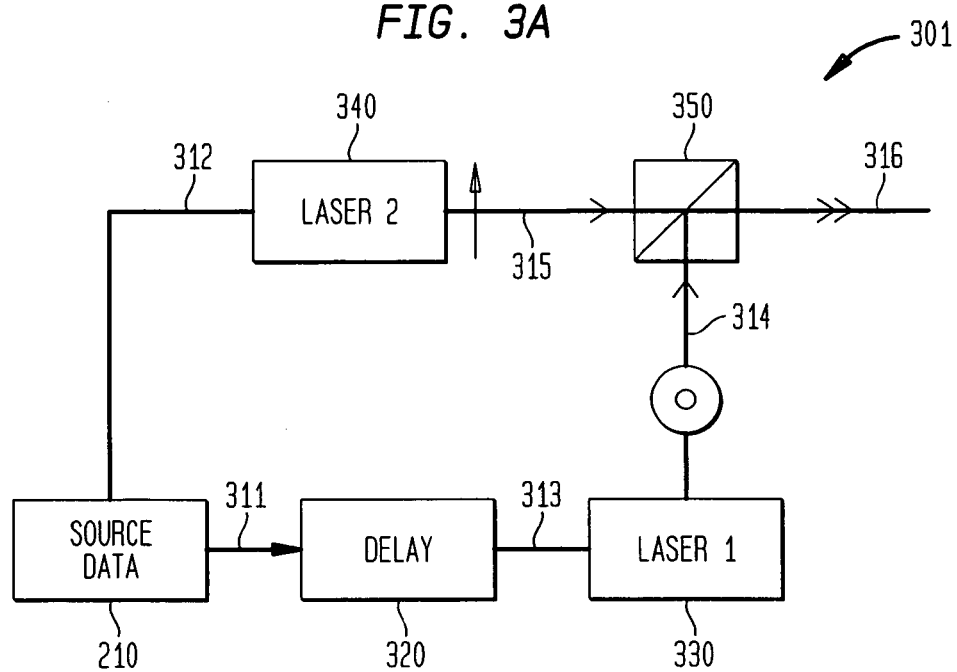
FIGS. 3A and 3B are illustrations of a communications system according to the present invention that utilizes polarization division.
Figure 3B:
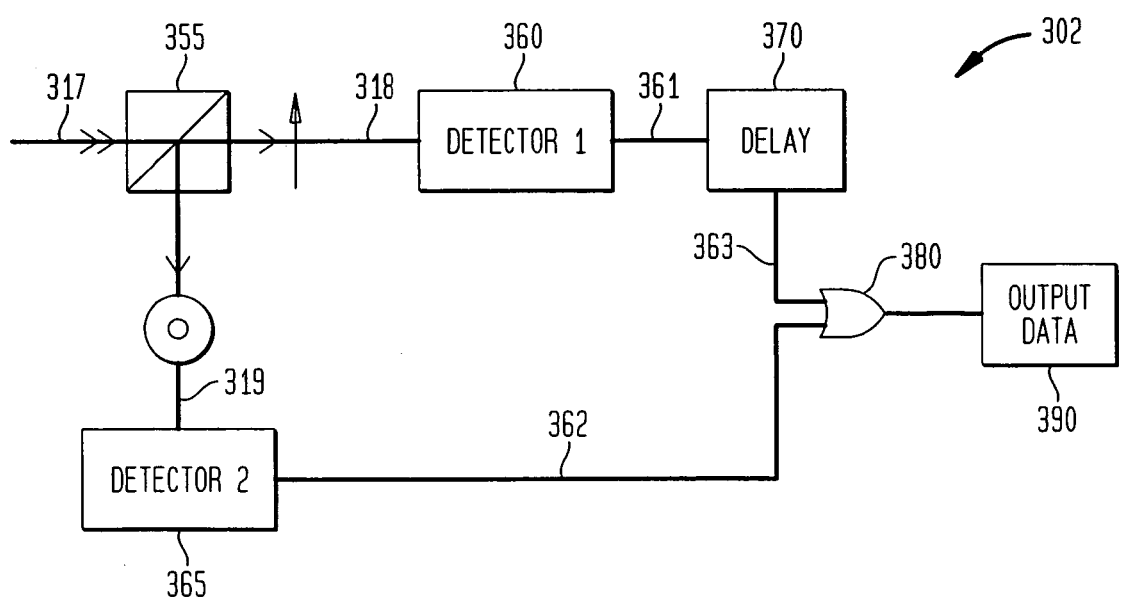

FIGS. 3A and 3B illustrate details of a communications system similar to that described in connection with FIG. 2, and which uses polarization modulation together with polarizing beam splitters in order to implement the present invention. FIG. 3A specifically illustrates the transmission side 301 of the communications system of FIGS. 3A and 3B. Initially, source data is duplicated into two identical source data signals 311, 312. In order to produce a set of temporally distinguishable transmission signals, one of the two source data signals is subject to a delay 320. As with the communications system 201 of FIG. 2, the delay 320 can be greater than approximately 1 millisecond, between approximately 1 millisecond and approximately 10 milliseconds, and preferably, can be between approximately 5 and approximately 10 milliseconds. Thus, the delay output 313 is simply a delayed version of source data signal 311. In this way, signals 312 and 313 constitute temporally distinguishable transmission signals.

At laser 1 330, transmission signal 313 is converted into a horizontally polarized optical signal 314. Laser 1 330 can be the type discussed above in connection with the communications system 201 of FIG. 2 and can include the additional components necessary to effectuate the conversion described, as would be apparent to one skilled in the relevant art. Modulation can be accomplished, for example, with amplitude modulation, though other types of modulation can be used without departing from the scope of the present invention. Meanwhile, at laser 2 340 transmission signal 312 is converted into a vertically polarized optical signal 315. Signals 314 and 315 are polarized orthogonal to one another. Thus, signals 314 and 315 are polarization divided and amplitude modulated light signals representative of transmission signals 313 and 312, respectively.

Polarization beam splitter 350 serves to combine signals 314 and 315 into a single transmission beam 316. Polarization beam splitter 350 is of the type known to those skilled in the relevant art. Polarization beam splitter 350 allows one of the two polarized optical signals, for example signal 315, to pass through while an orthogonally polarized signal 314 is reflected off an internal surface and caused to be co-incident with the first signal 315. Thus, the output is a single transmission beam 316 that includes both optical signals 314 and 315.

FIG. 3B illustrates of the receiver side 302 of the communications system of FIGS. 3A and 3B. The input to the receiver side is reception beam 317. Reception beam 317 corresponds to transmission beam 316 after having passed through the a turbulent medium and so may differ from transmission beam 316 at least to the extent that fading has occurred. Reception beam 317 is input into a polarization beam splitter 355 similar to polarization beam splitter 350 used at the transmitter side 301. Thus, the polarization beam splitter 355 separates the reception beam 317 back into separate optical signals 318, 319 based on the polarization of those signals. Optical signals 318 and 319 are converted back into electrical signals by detectors 1 and 2, 360 and 365, respectively. Thus, signals 361 and 362 represent received data signals.

Delay 370 is introduced to received data signal 361 in order to produce a delayed received data signal 363. Delay 370 is substantially the same as delay 320, so that received data signal 363 is aligned with received data signal 362. Since delay 370 is introduced into to what was the vertically polarized optical signal 318, and since delay 320 was introduced to source data signal 311 prior to conversion to optical signal 314 with horizontal polarization, received data signal 362 and delayed received data signal 363 should correspond to received versions of transmission data signals 311 and 312, respectively. Thus, by OR-ing signals 363 and 362 together at logic gate 380, an output data signal 390 can be produced. Since substantially the same delay was introduced at both ends of the communications system to a different one of the two originally identical signals 311 and 312, fading errors can be alleviated by combining the aligned received data signals 362, 363 together. Again, for the reasons discussed above, this is a result of non-correlation of the turbulence in an optical transmission path over time.

Figure 4A:
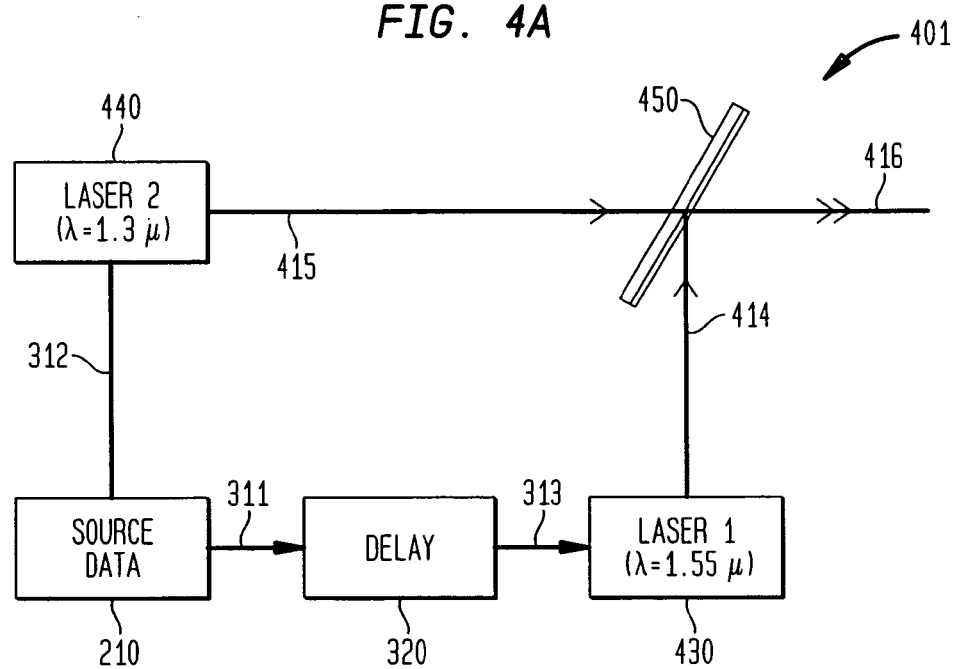
FIGS. 4A and 4B are illustrations of a communications system according to the present invention that utilizes frequency division.
Figure 4B:
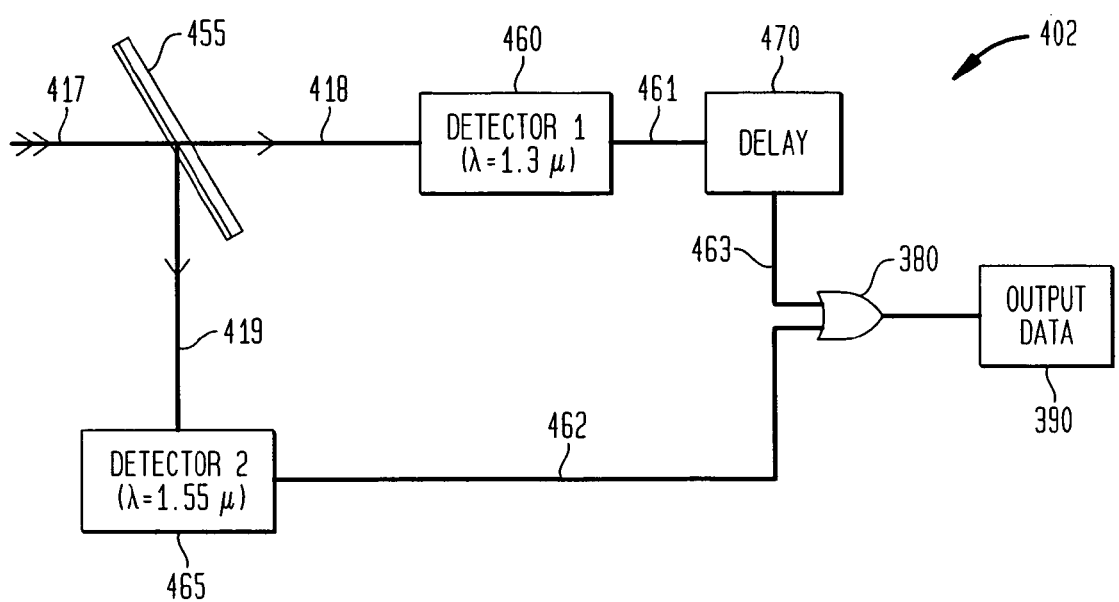

FIGS. 4A and 4B illustrate details of a communications system similar to that described in connection with FIG. 2, and which uses wavelength division together with dichroic mirrors in order to implement the present invention. The structure of FIGS. 4A and 4B generally corresponds to that of FIGS. 3A and 3B except for the details of wavelength division and beam combination and separation. Thus, like elements have been similarly numbered and will not be explained in detail again.

FIG. 4A specifically illustrates the transmission side 401 of the communications system of FIGS. 4A and 4B. As with the communications system of FIGS. 3A and 3B, the delay output 313 is simply a delayed version of source data signal 311. In this way, signals 312 and 313 constitute temporally distinguishable transmission signals.

At laser 1 430, transmission signal 313 is converted into an optical signal 414 with a wavelength of 1.55 μ. Since, as discussed above, a communications system according to the present invention is implemented using a return-to-zero technique, modulation merely involves the turning on and off of laser 1 430, i.e., amplitude modulation. While amplitude modulation is described in connection with the structure of FIGS. 4A and 4B, other types of modulation could be used without departing from the scope of the present invention. Laser 1 430 can be the type discussed above in connection with the communications system 201 of FIG. 2 and having a wavelength of 1.55 μ. Moreover, laser 1 430 can include the additional components necessary to effectuate the conversion described, as would be apparent to one skilled in the relevant art. Meanwhile, at laser 2 440, transmission signal 312 is converted into an optical signal 414 with a wavelength of 1.3 μ. Thus, signals 414 and 415 are modulated light signals having the frequencies indicated and representative of transmission signals 313 and 312, respectively.

Dichroic mirror 450 serves to combine signals 414 and 415 into a single transmission beam 416. Dichroic mirror 450 is of the type known to those skilled in the relevant art. Dichroic mirror 450 allows one of the two optical signals having a first wavelength, for example signal 415, to pass through while the other signal having a second wavelength, for example signal 414 is reflected off an internal surface and caused to be co-incident with the first signal 415. Thus, the output is a single transmission beam 416 that includes both optical signals 414 and 415.

FIG. 4B illustrates of the receiver side 402 of the communications system of FIGS. 4A and 4B. The input to the receiver side is reception beam 417. Reception beam 417 corresponds to transmission beam 416 after having passed through the a turbulent medium and so may differ from transmission beam 416 at least to the extent that fading has occurred. Reception beam 417 is input into a dichroic mirror 455 similar to dichroic mirror 450 used at the transmitter side 401. Thus, the dichroic mirror 455 separates the reception beam 417 back into separate optical signals 418, 419 based on the frequency of those signals. Optical signals 418 and 419 are converted back into electrical signals by detectors 1 and 2, 460 and 465, respectively. Thus, signals 461 and 462 represent received data signals.

Delay 370 is introduced to received data signal 461 in order to produce a delayed received data signal 463. As discussed above in connection with FIGS. 3A and 3B, delay 370 is substantially the same as delay 320, so that received data signal 463 is aligned with received data signal 462. Since delay 370 is introduced into to what was optical signal 418, and since delay 320 was introduced to source data signal 311 prior to conversion to optical signal 414, received data signal 462 and delayed received data signal 463 should correspond to received versions of transmission data signals 311 and 312, respectively. Thus, by OR-ing signals 463 and 462 together at logic gate 380, an output data signal 390 can be produced in substantially the same manner as that discussed above in connection with the structure of FIGS. 3A and 3B.

While the structures of FIGS. 3A, 3B, 4A, and 4B illustrate embodiments that include a single delay signal and a single type of modulation, the present invention is not so limited. Multiple delayed signals and multiple types of modulation can be used without departing from the scope of the present invention. As an example, FIG. 5A illustrates a transmitter side 501 of a communications system including a plurality of delayed signals and division schemes, while FIG. 5B illustrates a receiver side 502 of the same communications system.

Figure 5A:
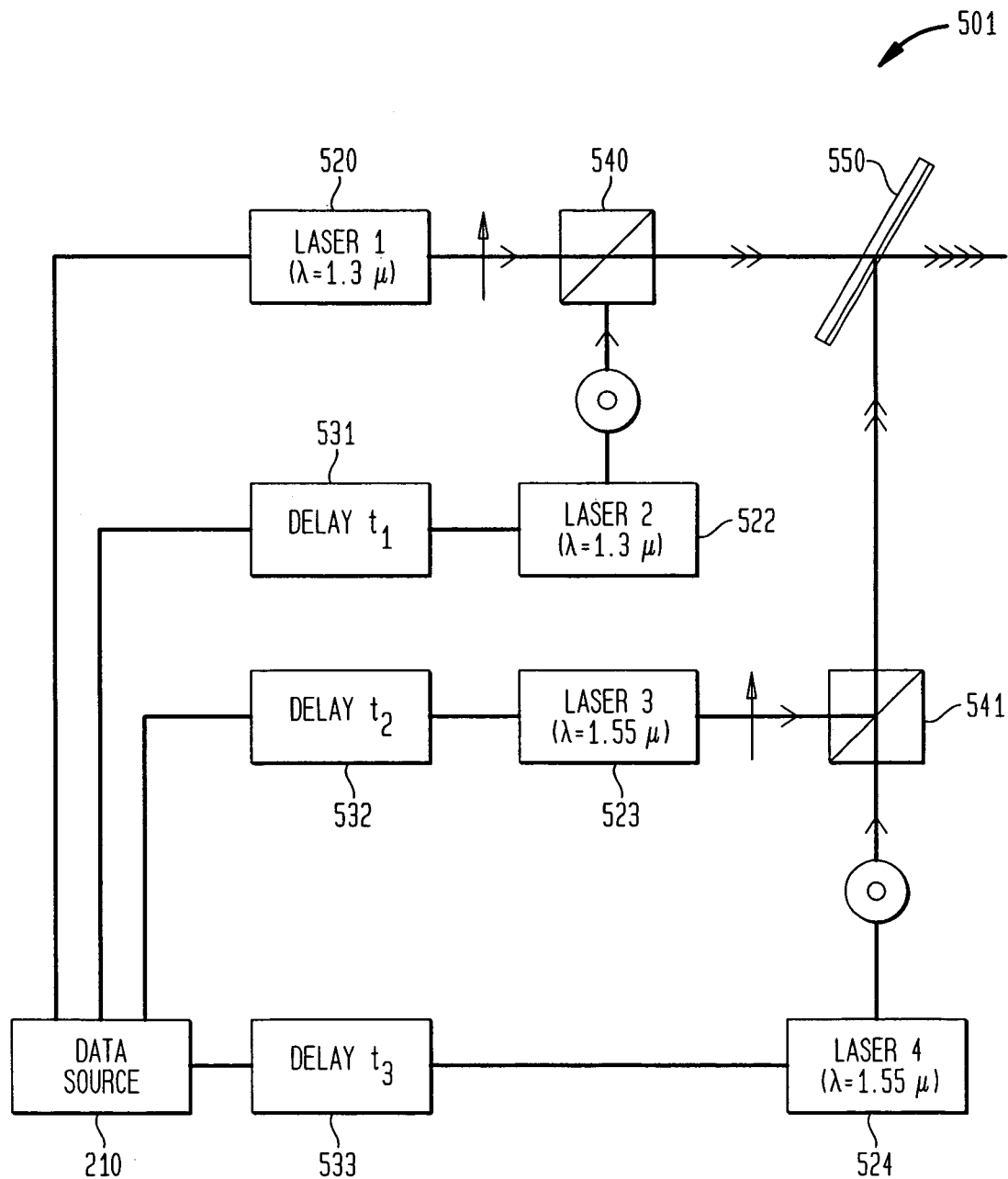
FIGS. 5A and 5B are illustrations of a communications system according to the present invention that utilizes both frequency and polarization division.

In the transmitter 502 of FIG. 5A, data source 210 is duplicated into four data source signals, three of which are subject to delays of times $t_1$, $t_2$, and $t_3$ at delay elements 531, 532, and 533, respectively. By combining the techniques of the structures explained above, four temporally distinguishable transmission signals can be combined into a singe transmission beam through the use of lasers 1 520, 2 522, 3 353, and 4 524, two polarizing beams splitters 540, 541, and a single dichroic mirror 555, in the manner illustrated. While transmitter 501 illustrates one way of combining multiple wavelengths and polarizations, other combinations would not depart from the scope of the present invention, as would be apparent to one skilled in the relevant art given this disclosure. For example, the receiver 502 of FIG. 5B illustrates a slightly different arrangement in order to show that various arrangements are possible.

Figure 5B:
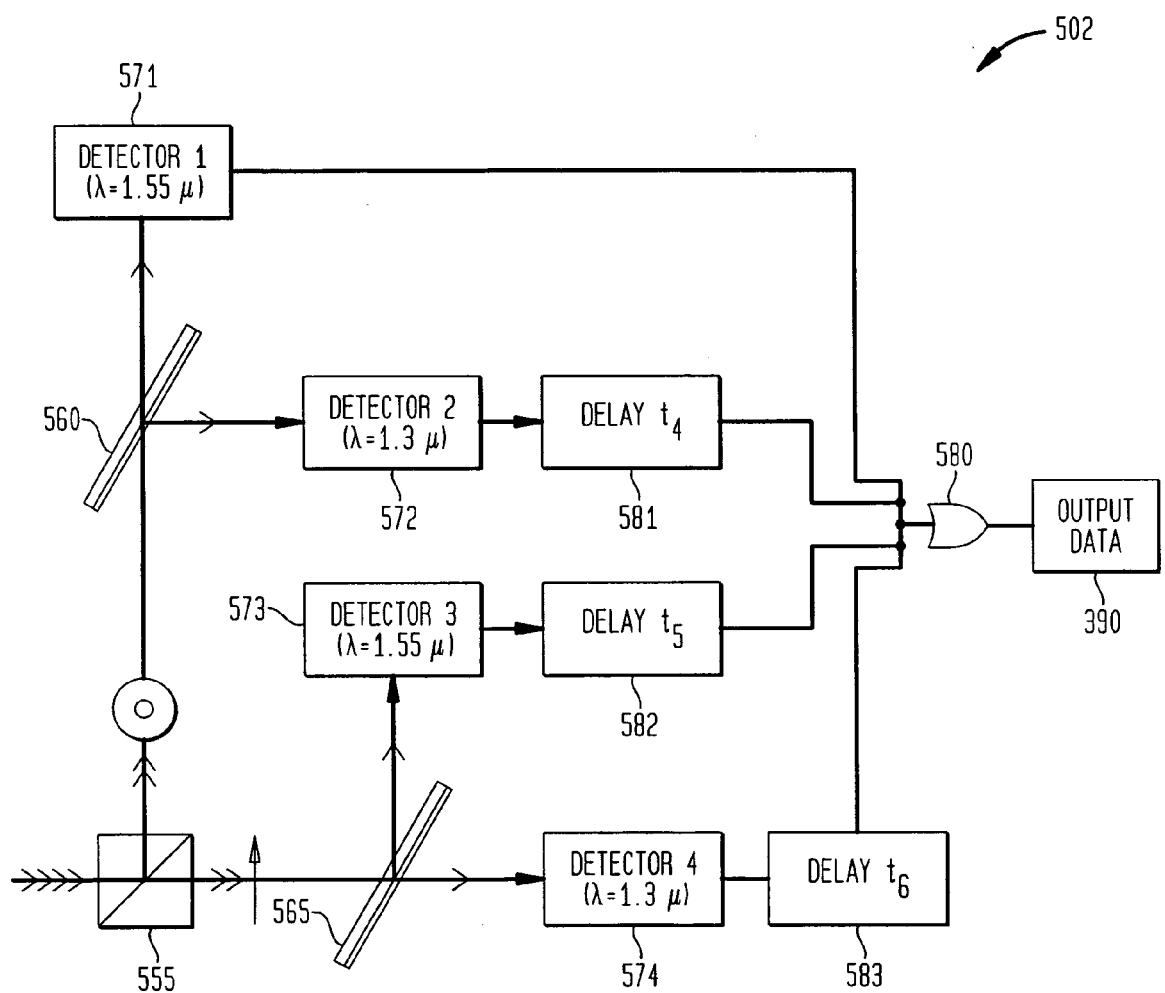

Receiver 502 of FIG. 5B uses polarizing beam splitter 555, dichroic mirrors 560 and 565, and detectors 1 571, 2 572, 3 573, and 4 574 to separate the received beam and convert it into received data signals in the manner as shown. In order to temporally align the received data signals, appropriate delays $t_4$, $t_5$, and $t_6$, are introduced at delay elements 581, 582, and 583, respectively. Since the output of detector 1 571, corresponds to the original data signal subject to the longest transmission delay (note that detector 1 corresponds to the horizontally polarized 1.55 μ optical signal originally subject to delay $t_3$) no delay is necessary. Instead, the delay elements 581, 582, and 583, must be chosen such that the total delay associated to each received data signals is substantially equal to delay $t_3$. As an example, if $t_1$ was 1 millisecond, $t_2$ was 2 milliseconds and $t_3$ was 3 milliseconds, $t_4$ should be 2 milliseconds since the horizontally polarized 1.3 μ optical signal corresponds to the source data signal subject to a 1 millisecond delay. Following the same logic, $t_5$ should be 1 millisecond since the vertically polarized 1.55 μ optical signal corresponds to the source data signal subject to a 2 millisecond delay. Finally, $t_6$ should be 3 milliseconds since the vertically polarized 1.3 μ optical signal corresponds to the source data signal that was not subject to delay.

Thus, once the appropriate delays are introduced, the received data signals can be OR-ed together at a logic gate 580 to produce output data 390. Since the number of signals, and thus the number of non-correlated transmission paths, is increased in the structure of FIGS. 5A and 5B, improved error reduction can be achieved even over that achieved by virtue of the single delay structures discussed above. Furthermore, the structure of FIGS. 5A and 5B is but one example of a multiple delay implementation of the present invention, other implementations with differing amounts of delay could be used without departing from the scope of the present invention, as would be apparent to one skilled in the relevant art.

Figure 6:
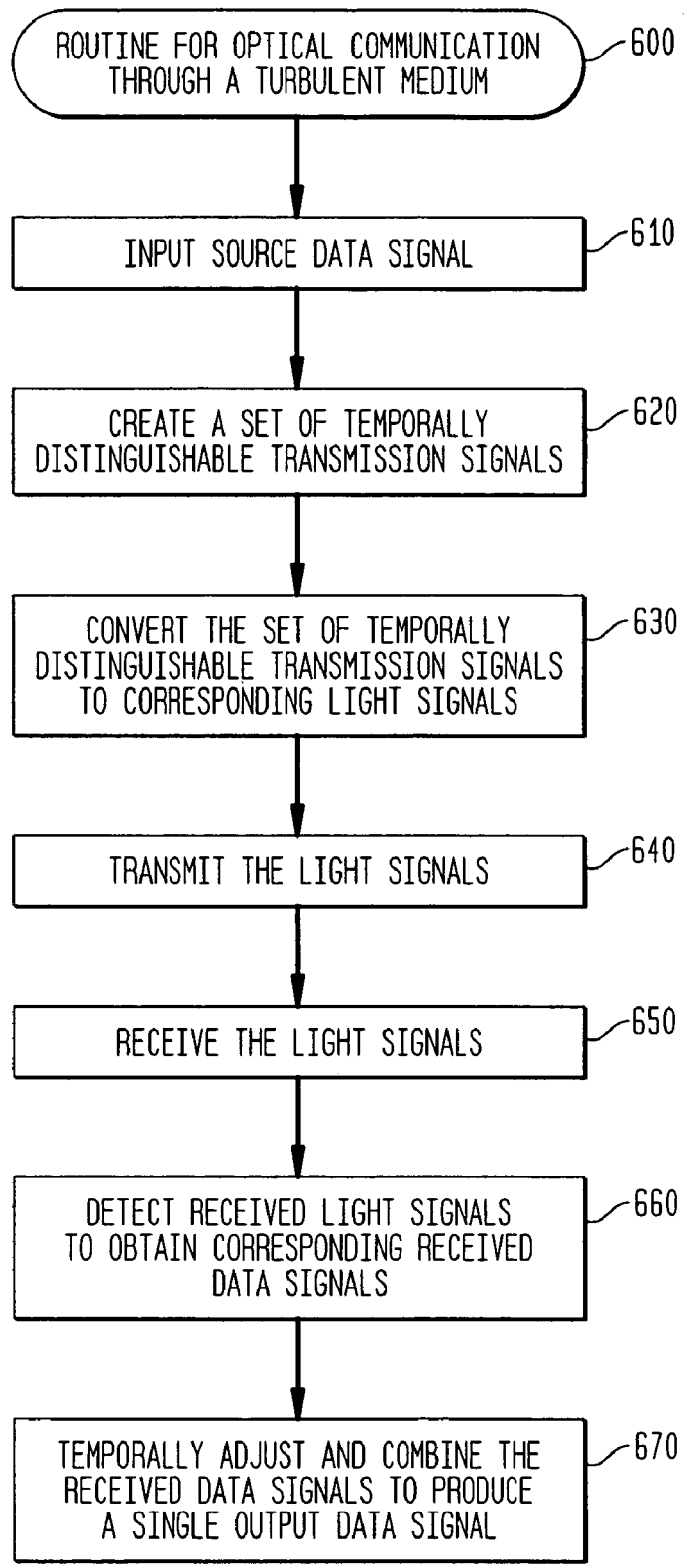
FIG. 6 is an illustration of a routine for optical communication through a turbulent medium.

FIG. 6 is an illustration of a process flow diagram of a routine for optical communication through a turbulent medium 600 according to the present invention. In a first step 610 of routine 600, a source data signal is input. Such a source data signal can be a digital signal representative of any desired information. A data rate of the source data signal is limited only by the switching speed of the various components used to implement routine 600, as would be apparent to one skilled in the relevant art. In a next step 620, a set of temporally distinguishable transmission signals is created. Such a set is created by creating at least one duplicate of the input source data signal and then adding an appropriate delay to one of the data signals within the set. Thus, the set of temporally distinguishable data signals can include a non-delayed signal and at least one additional signal distinguishable from the non-delayed signals through the addition of an appropriate delay. Such an appropriate delay can be at least approximately 1 millisecond according to the present invention. Preferably, the delay is between approximately 1 millisecond and approximately 10 milliseconds. More preferably, the delay should be between approximately 5 and approximately 10 milliseconds. The set of temporally distinguishable transmission signals created in step 620 can include multiple delayed transmission signals with varying delay times.

In a next step 630, the set of temporally distinguishable transmission signals are converted to light signals. This step 630 can be performed through modulation of one or more light sources with the transmission signals from step 620 resulting in a set of light signals corresponding to the temporally distinguishable transmission signals. Such modulation can include amplitude, frequency, phase, or polarization modulation, or a combination of these. Such a light source can include a laser or LED beam. For example, a 1.3 micron (μ) or a 1.55μ laser can be used as a light source. The laser can be a pig-tailed laser diode. The laser output can be boosted with an erbium doped fiber amplifier (EDFA) and can be collimated to prevent spreading as would be apparent to one skilled in the relevant art. The laser can be fiber coupled. Other light sources or modulation techniques could be used with departing from the scope of the present invention. Moreover, different wavelengths, polarizations, etc. can be used during step 630 in order to accomplish wavelength division, polarization division, etc.

In a next step 640 the light signals produced in step 640 are transmitted. Step 640 can include combining the light signals into a single transmission beam through the use of one or more polarizing beam splitters, dicrhoic mirrors, and the like. Beam steering can also be performed during the transmission step 640 in order to maintain contact with a receiver, as would be apparent to one skilled in the relevant art.

In a next step 650, the light signals transmitted in step 640 are received. The receiving step 640 can include separating a received beam into various component received light signals through the used of one or more polarizing beam splitters, dichroic mirrors, and the like.

In a next step 660, the received light signals are detected to obtain corresponding received data signals. Such detection thus includes conversion of the light signal into an electrical signal with any additional steps necessary to produce a received data signal generally corresponding to one of the set of temporally distinguishable transmission signals created in step 620, above, as would be apparent to one skilled in the relevant art given this disclosure.

In a final step 670, the received data signals are temporally adjusted and combined to produce a single output data signal. Such temporal adjustment involves introducing appropriate delays into to the received data signals so as to temporally align the received data signals. Such temporal alignment can involve quartz controlled resynchronization with precise use of clock frequencies as would be apparent to one skilled in the art. Furthermore, headers can be placed within the data signals as appropriate to aid in resynchronization. Once temporally aligned, the received data signals are combined to produce a single output data signal. This combination can be accomplished through the use of a logic gate. For example, the temporally aligned received data signals can be input to an OR-gate so as to produce a single output data signal. Other combination techniques could be used without departing from the scope of the present invention.

Example Applications

One application of the present invention is in optical wireless communications for short-range, high data rate links as found in a local area network (LAN) or other type of network. The present invention can be used in packet-switched networks to achieve higher data transmission. The present invention can be used as a link in any type of public or proprietary network. The present invention can be a bridge between networks. The present invention can be used to bridge gaps in ground-based networks as well as ground-to-satellite communications. For example, the present invention can be used to provide links between different sites on different office buildings. This is especially helpful where it is impractical to install fiber optic cable or other types of links due to cost, regulation or physical impediments. In military applications, optical wireless links as in the present invention can provide physically secure, covert, low probability of detection communications. Optical wireless links as in the present invention can further be used to carry outside television broadcasts, such as, sporting events. No infra-structure cables need to be laid. The power requirement of a compact optical link are low and battery-powered operation is feasible.

Example Results

In example tests, the inventor has demonstrated that delayed diversity significantly reduces fading on a 1 km test range using a 633 nm laser transmitter working at eye-safe intensity levels.

Fading Models

It is helpful to consider theoretical issues associated with fading. These theoretical issues and models of fading are provided to better understand the advantages of the present invention and are not intended to limit the present invention. These models do indicate the bit error rate performance changes by the second power when the set of delayed diversity light signals has two light signals and changes by the fourth power when the set of delayed diversity light signals has four light signals.

Fading can be understood further as follows. If the average optical power reaching the reaching the receiver is, $\overline{P}$ and the minimum received power for adequate link performance is $P_t$, then for scintillations that cause the instantaneous received power P to be below $P_t$, a fade results. The fraction of observation time during which the link is in a "fade" condition depends on the strength of the turbulence, as reflected in the statistics of turbulence induced fluctuation of P, $P_t$.

The fractional fade time can be computed for certain models of the turbulence, as is shown in an attached Appendix. It can be seen that the fractional fade time increases as the "link margin" $\overline{P} - P_t$ decreases, as the strength of the turbulence, characterized by the refractive index structure constant $C_n^2$ increases, and as the range increases.

Overview of Theories

It is helpful to review highlights of theories relevant to a practical analysis of potential line-of-sight optical communication links. Specific numerical results obtained from theory that help to put much of the generalized literature into specific context are discussed.

Although theoretically there are differences in the way the atmosphere perturbs plane waves, spherical waves, and focused laser beams, there is considerable similarity between many of the effects on the plane waves and collimated laser beams. Consider results that deal specifically with plane waves (In practice ideal plane waves do not exist, what is referred to here are finite plane waves transmitted from an aperture that is sufficiently large that the field amplitudes do not vary significantly over most of the aperture), and in the case of laser beam wander, collimated laser beams. The field of such a wave propagating in the z direction can be represented at the transmitter as $$E = E_0 e^{j(\omega t - kz)}. \tag{1}$$

The magnitude of the wave vector k is $k = 2\pi/\lambda$, where $\lambda$ is the wavelength of the wave. For a plane wave $E_0$ is constant over the transmitter aperture, assume it is located in the plane z=0 and for a linearly polarized wave E assume it always points in the same direction. Then for a laser beam, the field distribution at the transmitter is $$E(r) = E_0 e^{-r^2/w^2}, \tag{2}$$

where w is the spotsize at the transmitter. Because the atmosphere is not intrinsically chiral, left and right circularly polarized waves should be identically affected by turbulence so one does not expect any significant perturbation of the polarization state of a light wave that has propagated through turbulence. At a receiver aperture located a z=L, the electric field fluctuates in time and space because of turbulence. Because turbulence is a random process one cannot describe the electric field E(z,r,t) deterministically. All that is possible is to consider various averages and correlation functions of the field. To do this something must be said about the statistical properties of the fluctuating density, temperature, or refractive index of the atmosphere. For the refractive index fluctuations this is done through the refractive index structure function $D_n(r)$ defined by $$D_n(r) = \langle [n(r_1 + r) - n(r_1)]^2 \rangle, \tag{3}$$

where the < . . . > brackets indicate statistical averaging, and $r + r_1$ and $r_1$ are two points in the atmosphere separated by a distance |r|. For locally homogenous and isotropic turbulence (so-called Kolmogorov turbulence) the structure function only depends on the separation of the two observation points. According to the Kolmogorov-Obhukov two-thirds law, for separations that satisfy $l_0 \ll L_0$ are called the inner and outer scales of turbulence, $$D_n(r) = C_n^2 r^{2/3} \quad (4)$$

In the atmosphere near the ground typically $l_0 \sim$ mm and $L_0 \sim 1$ m, although $L_0$ varies with height above the ground. These scales can be thought of as the range of sizes of the "blobs" or "bubbles" of different refractive index that exist in the atmosphere. The smallest size is determined by viscous damping effects and the largest size by the spatial size of the large scale movement of the air as it flows. Separations that lie between $l_0$ and $L_0$ are said to be in the internal sub-range. The constant $$C_n^2$$

that appears in Eq. (4) is called the refractive index structure constant, it is measured in units of $m^{-2/3}$ and is the most common parameter used to describe the strength of atmospheric turbulence. Its value near the ground typically varies from $10^{-16}$ to $10^{-13}$ to $m^{-2/3}$.

The Von Karman Spectrum

Because the spatial fluctuations in refractive index in the turbulent atmosphere are random, only statistical averages of their effect on a propagating save can be calculated. It is usual to describe the statistical properties of the refractive index in terms of its Fourier transform into k space. This is equivalent to imagining at any instant that the spatial distribution of index in the atmosphere can be decomposed into a three-dimensional distribution of periodic refractive index gratings with varying periodicities. The spectrum of the refractive index fluctuations is often represented by the Von Karman spectrum, which will be used for the calculations that will be described later. The form of the Von Karman spectrum that the inventor has used is $$\Phi_n(r, \kappa) = \frac{0.033 * C_n^2(r)\exp\left[-\left(\frac{\kappa l_0}{2\pi}\right)^2\right]}{[\kappa^2 + L_0^{-2}]^{11/6}} \quad (5)$$

Frequently, for line-of-sight optical links that run parallel to the ground, the $C_n^2$ (r) parameter will be a constant along the path.

The Rytov Method

An established method for analyzing the propagation of waves in weak turbulence is the Rytov method, which writes the field of the wave in the form $$E(r) = e^{\psi(r)}, \quad (6)$$

and develops a series solution to E in the form $$E = \exp(\psi_0 + \psi_1 + \psi_2 + \dots). \quad (7)$$

The contribution from the term $\phi_1$ is the first approximation to the effect of the random medium through which the wave passes. This term is usually written as $$\psi_1(r) = \chi + iS_1, \quad (8)$$

where x represents the first order fluctuation of the log of the amplitude of the field and $S_1$ is the first wave order phase fluctuation. The Rytov solution for the intensity fluctuations of a plane wave, when the turbulence is sufficiently weak, gives a variance for the log intensity fluctuations of $$\sigma_{\ln I_R}^2 = \langle (\ln I - \langle \ln I \rangle)^2 \rangle = 4\sigma_x^2 = 1.23 C_n^2 k^{7/6} L^{11/6} \quad (9)$$

The notation here indicates that this is a variance of log intensity fluctuations: the R subscript emphasizes that this variance holds in the Rytov regime, where the turbulence is weak. When the turbulence is not weak, it is still possible to refer to the Rytov variance, as calculated from Eq.(9), but this calculated variance will not agree with the measured variance. It is easy to show that the variance of the log normalized intensity variations $(I/\langle I \rangle)$ is also equal to $\sigma_{\ln I_R}^2$. Eq.(9) predicts that as the strength of turbulence or the range L increase that the variance of the log intensity fluctuations increases without limit. In practice, the variance of the log intensity fluctuations is found to saturate as the turbulence increases, and then decrease slowly as the turbulence becomes even larger. In practice the Rytov method only predicts the correct variance provided $\sigma_{\ln I_R}^2 < 0.3$. When this condition holds true the turbulence is said to be weak. For weak turbulence $\langle (I/\langle I \rangle)^2 - 1 \ll 1$. The turbulence is relatively "strong" for $\sigma_{\ln I_R}^2 > 1$, although true strong turbulence may require $\sigma_{\ln I_R}^2$ to be larger than 25. A second important parameter is the variance of the normalized intensity fluctuations, which is $$\sigma_I^2 = \frac{\langle I^2 \rangle - \langle I \rangle^2}{\langle I \rangle^2} \quad (10)$$

For weak turbulence the Rytov variance can be re-written as $$\sigma_{\ln I_R}^2 = \left\langle \left(\ln\left(\frac{I}{\langle I \rangle}\right)\right)^2 \right\rangle \quad (11)$$

$$= \left\langle \left(1 - \frac{I}{\langle I \rangle}\right)^2 \right\rangle$$

$$= \frac{\langle I^2 \rangle - \langle I \rangle^2}{\langle I \rangle^2}$$

Consequently, in weak turbulence $$\sigma_{\ln I_R}^2 = \sigma_I^2. \quad (12)$$

In other words, if the intensity variance is observed under conditions of weak turbulence it will be identical to the variance of the log intensity.

The Normal Distribution of Log Amplitude Fluctuations

It is found experimentally that for both weak turbulence, and for strong turbulence that satisfies the condition $25 < \sigma_{\ln I_R}^2 < 100$, that the distribution of log field amplitude is a normal distribution, as are the log intensity variations measured at a point. In other words a point detector will see a distribution of log intensities that satisfies $$p(\ln I) = \frac{1}{(2\pi\sigma_{\ln I}^2)^{1/2}} \exp\left[\frac{(\ln I - \langle \ln I \rangle)^2}{2\sigma_{\ln I}^2}\right], \quad (13)$$

where $\langle \ln I \rangle$ is the average value of lnI. If in Eq.(12) one uses normalized intensities, and write $i = I/\langle I \rangle$, then $l = \ln i$ and the distribution of l is also [l]

$$p(l) = \frac{1}{(2\pi\sigma_l^2)^{1/2}} \exp\left[-\frac{(l - \langle l \rangle)^2}{2\sigma_l^2}\right], \tag{14}$$

where $\sigma_l^2 = \sigma_{\ln I_R}^2$. This notation is chosen by the inventor to be consistent with that used by Yura and McKinley (Yura, H. T. and McKinley, W. G., *Appl. Opt.* 22:3353–3358 (1983)).

If a random variable z is normally distributed, then a standard result from statistical theory is that the average of exp(z) is $$\langle \exp(z) \rangle = \exp\left[\langle z \rangle + \frac{1}{2}\langle (z - \langle z \rangle)^2 \rangle\right]. \tag{15}$$

Consequently, $$\langle \exp(\ln I) \rangle = \exp\left[\langle \ln I \rangle + \frac{1}{2}\sigma_{\ln I}^2\right], \tag{16}$$

which gives $$\langle I \rangle = \exp\left[\langle \ln I \rangle + \frac{1}{2}\sigma_{\ln I}^2\right], \tag{17}$$

and $$\ln\langle I \rangle = \langle \ln I \rangle + \frac{1}{2}\sigma_{\ln I}^2 \tag{18}$$

Eq.(18) can be written as $$\ln\langle I \rangle = \langle l \rangle + \frac{1}{2}\sigma_{\ln I}^2, \tag{19}$$

which if $\langle I \rangle = 1$ means that $\ln I = 0$ and $$\langle l \rangle = -\frac{1}{2}\sigma_{\ln I}^2 \tag{20}$$

Consequently, the probability distribution for log intensity and log (normalized intensity) is $$p(l) = \frac{1}{(2\pi\sigma_l^2)^{1/2}} \exp\left[-\frac{(l + (1/2)\sigma_l^2)^2}{2\sigma_l^2}\right]. \tag{21}$$

One can change Eq.(21) into the distribution for normalized intensity i by noting that $d(\ln i) = di/i$ and get $$p(i) = \frac{1}{(2\pi\sigma_l^2)^{1/2}} \frac{1}{i} \exp\left[-\frac{1}{2\sigma_l^2}\left(\ln i + \left(\frac{1}{2}\right)\sigma_l^2\right)^2\right]. \tag{22}$$

If the variance of the log intensity fluctuations is measured, then Eq.(22) can be used to predict the likelihood of received signal level falling below a specified value. In an optical communication link, if the normalized signal level falls below some specified value $i_0$ this can be characterized as a fade. Yura and McKinley (Yura, H. T. and McKinley, W. G., *Appl. Opt.* 22:3353–3358 (1983)) give an expression for the fraction of time that a link will be in an example fade condition. This is $$\text{frac}(i \leq i_0) = \text{Probability}(i \leq i_0) = \text{Probability}(i \leq i_0), \tag{23}$$

which can be calculated from $$\text{frac}(i \leq l_0) = \frac{1}{(2\pi\sigma_l^2)^{1/2}} \int_{-\infty}^{\ln i_0} \exp\left[-\frac{(l + (1/2)\sigma_l^2)^2}{2\sigma_l^2}\right] dl. \tag{24}$$

which gives $$\text{frac}(i \leq l_0) = \frac{1}{2}\left\{1 + \text{erf}\left[\frac{(\ln i_0 + (1/2)\sigma_l^2)^2}{2\sigma_l^2}\right]\right\} \tag{25}$$

where erf is the error function. The variance to be used in Eq.(25) is the actual variance observed for the link (assuming that fluctuations remain in log normal), and would be related to $C_n^2$ by Eq.(9) in the case of sufficiently weak turbulence. Since the average intensity in this discussion is normalized to one, then in general an example fade (not intended to limit the present invention) can be considered to correspond to $i_0 < 1$, and if the power margin of the link is sufficiently large $i_0 << 1$. If the optical power margin for a given bit-error-rate (BER) is M dB, then $10\log_{10}(1/i_0) = M$ and $l_0 = -0.23025M$.

For a BER of $10^{-9}$ this requires an input optical signal 11.89 times higher than the noise equivalent power (NEP) of the receiver. The NEP is usually defined as the optical input power that provides a signal equal to the noise. This will depend on bandwidth, which itself varies for a given bit rate depending on the precise modulation scheme used. For example, a return-to-zero (RZ) format requires double the bandwidth of a non-return-to-zero format (NRZ). The bandwidth requirement can also increase if error correction is incorporated into the data system.

Note that for log intensity variance values >0.3, the log intensity variance cannot strictly be related to the turbulence level $C_n^2$ by Eq.(9). Because the log intensity variance saturates as the turbulence becomes strong, strong turbulence will not lead to as many fades as might be predicted using Eq.(9).

When delayed diversity according to the present invention is incorporated into this theory, then 2-fold diversity fading is calculated from $\text{frac}^2$, and 4-fold diversity fading from $\text{frac}^4$.

FIG. 7A shows some calculations from Eq. (25). The figure shows the fraction of the time that a fade of a given depth will occur for various levels of intensity variance. However, even though the fading characteristics on the link can be calculated in this way, this does not directly predict what will happen to the BER.

Bit Error Rates on a Fading Link

The atmosphere fluctuates relatively slowly: roughly speaking there is not much fluctuation on time scales below about 1 ms. Consequently, at least at high data rates, large numbers of bits are transmitted through a channel that is in a "frozen" state, but for successive groups of bits the characteristics of the channel slowly change. Consequently, the BER is constantly changing. However, by averaging over the appropriate intensity distribution function, and using the function describing the probability of making an error in detecting a "one" an average BER can be calculated for different log intensity variances. To keep the discussion relatively simple a RZ format is used for the transmitted data, although it is straightforward to modify the discussion for other schemes.

In the absence of turbulence the received detector signal corresponding to a "one" has a steady value <I>, and normalized received signal is 1. In this case the BER can be calculated by assuming that errors result from received noise, which is assumed to be Gaussian distributed about zero. For a detector whose noise is Gaussian distributed about zero with a variance ($i^2_N$) the probability that the noise is below a set level $i_s$ is $$P(i_N \le i_s) = \frac{1}{\sigma\sqrt{2\pi}} \int_{-\infty}^{s} e^{-x^2/2\sigma^2} dx, \quad (26)$$

where $\sigma^2$ ($i^2_N$). The signal-to-noise ratio is $$\frac{S}{N} = \frac{\langle I \rangle^2}{\sigma^2}. \quad (27)$$

If the decision level of detecting a "one" is set at a received intensity value of I/x, then a "one" error results if the detector noise $i_N < -1(1-1/x)$. On the other hand, for a received "zero" error results if $i_N > I/x$.

On average, a binary bit stream contains an equal number of "ones" and "zeros" so the overall probability of error is $$p_e = \frac{1}{2}[P(i_N < -I(1-1/x)) + P(i_N > I/x)], \quad (28)$$

which gives $$p_e = \frac{1}{2\sigma\sqrt{2\pi}} \left( \int_{-\infty}^{-I(1-I/x)} e^{-x^2/2\sigma^2} dx + \int_{I/x}^{\infty} e^{-x^2/2\sigma^2} dx \right) \quad (29)$$

which becomes $$p_e = \frac{1}{2}\left[\frac{1}{2}erfc\left(\frac{(1-1/x)}{\sqrt{2}}\sqrt{\frac{S}{N}}\right) + \frac{1}{2}erfc\left(\frac{1}{x\sqrt{2}}\sqrt{\frac{S}{N}}\right)\right]. \quad (30)$$

The minimum BER results in this case for a decision level setting corresponding to x=2: the decision level lies halfway between the signal levels corresponding to a "one" and a "zero". The BER is a function of S/N is shown for this case in FIG. (7B). For a BER of $10^{-9}$ the S/N ratio must be 141, or 21.5 dB, which requires an input optical signal 11.89 times higher than the noise equivalent power (NEP). The NEP is usually defined as the optical input power that provides a signal equal to the noise. This will depend on bandwidth, which itself varies for a given bit rate depending on the precise modulation scheme used. For example, a return-to-zero (RZ) format requires double the bandwidth of a non-return-to-zero format (NRZ). The bandwidth requirement can also increase if error correction is incorporated into the data stream.

When the received signal fluctuates because of the effects of atmospheric turbulence the BER changes. One can still use a S/N ratio defied according to Eq. (27), but <I> is now the average signal corresponding to a received "one". In this case, at any instant the actual receive S/N ratio will rise or fall depending on whether the turbulence causes a "fade" or a "surge". The probability of a "zero" error does not change because there is no received signal when a "zero" arrives and can be written as $$p_{zero} = \frac{1}{2}erfc\left(\frac{1}{x\sqrt{2}}\sqrt{\frac{S}{N}}\right). \quad (31)$$

However, the probability of a "one" error is now $$p_{one} = \frac{1}{2}erfc\left(i - \frac{1}{x}\right)\frac{1}{\sqrt{2}}\sqrt{\frac{S}{N}}, \quad (32)$$

where i is the detector signal corresponding to the actual received normalized intensity.

To compute the average BER, the product of the probability of a "one" error and the probability distribution for the normalized intensity must be integrated over all possible intensity values. This gives $$\langle BER \rangle = \int_{0}^{\infty} \frac{1}{2}erfc\left(i - \frac{1}{x}\right)\frac{1}{\sqrt{2}}\sqrt{\frac{S}{N}} \frac{1}{(2\pi\sigma_i^2)^{1/2}} \frac{1}{i} \exp\left[-\frac{1}{2\sigma_i^2}(\ln i + (1/2)\sigma_i^2)^2\right] di. \quad (33)$$

The Role of the Threshold Detection Value

When there is no fading on the link, minimum BER is obtained by setting the detection threshold for a "one" half way between 0 and the received signal level when a "one" is actually received. In this case noise makes equal contributions to errors where "ones" are detected as "zeros" and vice versa. If the threshold level is raised above a normalized value of ½, then the probability of "zero" errors decreases, by the probability of "one" errors rises. If the threshold level is set below a normalized value of /1;2 then the probability of "one" errors falls, but the probability of "zero" errors rises.

When the received signal level fluctuates it can be advantageous to set the threshold level below the ½ value. The number of "one" errors can be reduced in this case to a greater extent than the "zero" errors are increased. This will be apparent in results discussed below.

The Use of Delayed Diversity

If the average probability of a bit error is $\bar{p}_e$, then if the same bit stream is re-detected after a time longer than correlation times in the atmosphere, then the average probability of error in the next bit stream is also $\bar{p}_e$. Consequently, the joint probability of error when the diversity approach is used $(\bar{p}_e)^2$.

Results

FIGS. (7C) to (7F) show calculations of BER for different levels of intensity variance, and for different settings of the threshold setting for detection of a "one". It is clear that delayed diversity can significantly improve the performance of the link, especially as the turbulence gets stronger. Changing the threshold detection value from the ½ value can provide a significant improvement in bit-error-rate performance, provided the link has adequate power margin. This is likely to be an adjustment that would, ideally, be made dynamically with a "smart" system that can spot the change in error performance.

Figure 7G:
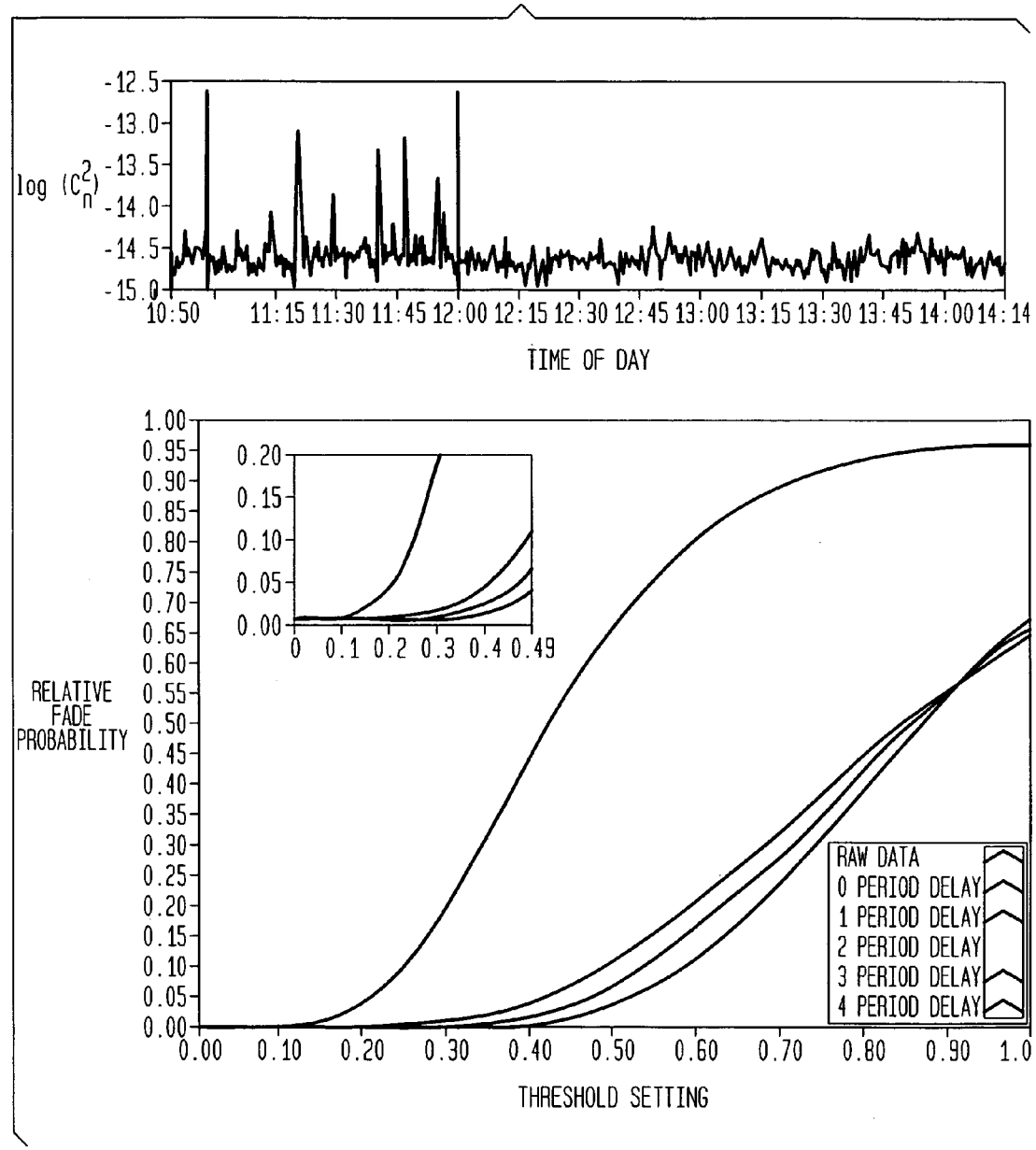
FIG. 7G shows experimental data from experiments carried out on the University of Maryland 1 km test range.
Figure 7H:
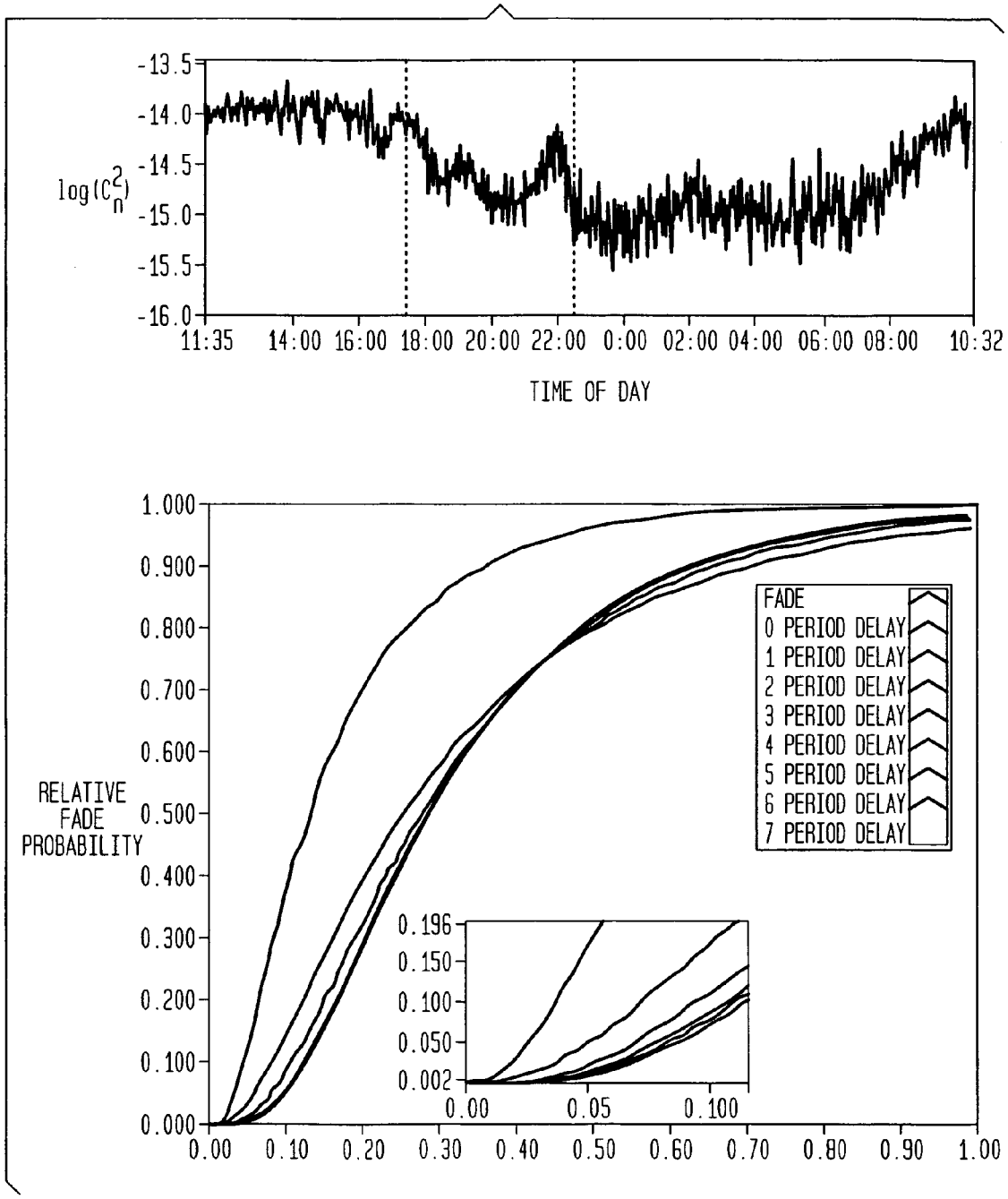
FIGS. 7H–7N show additional data recorded at the University of Maryland test range.
Figure 7I:
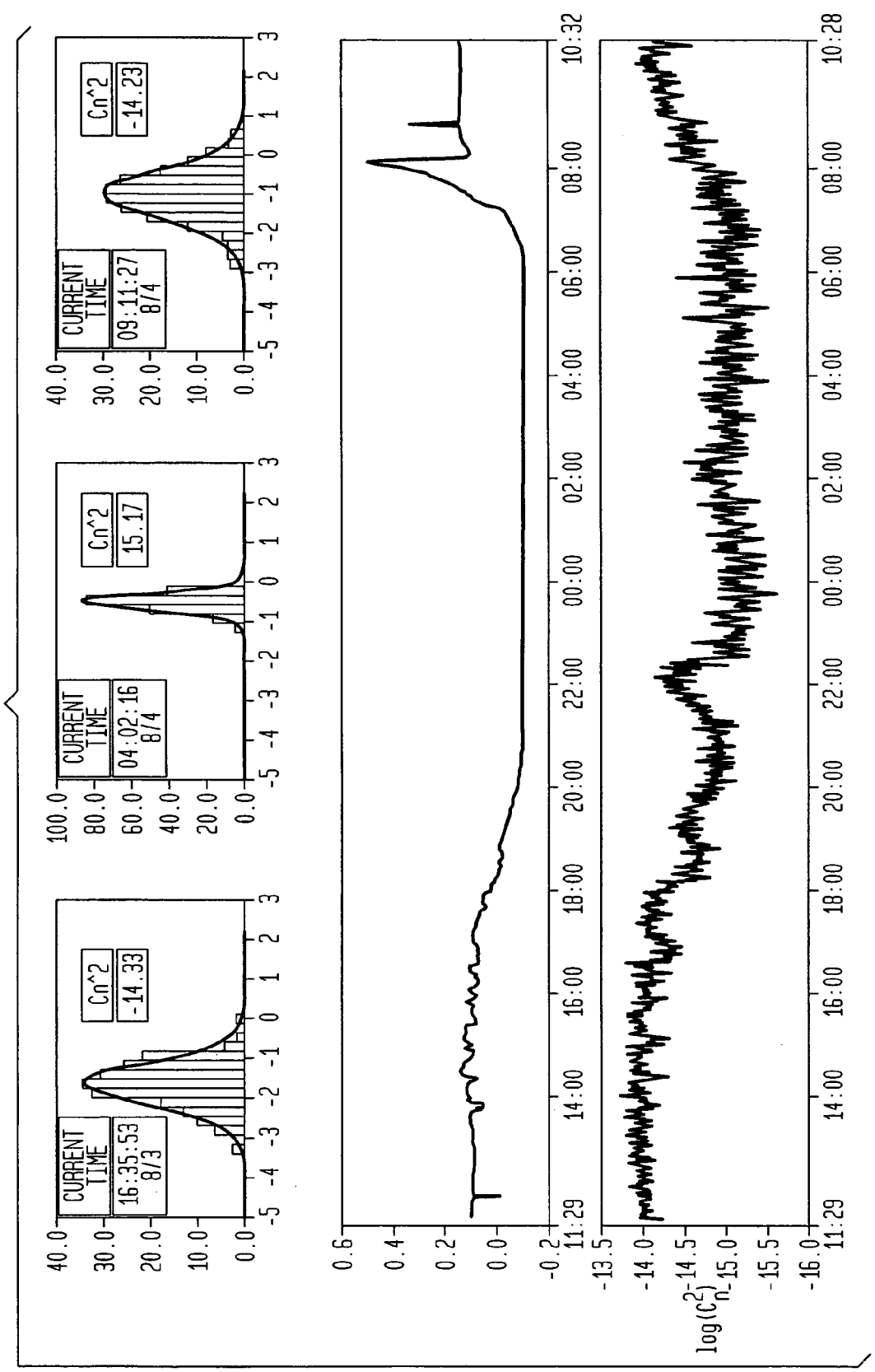
Figure 7J:
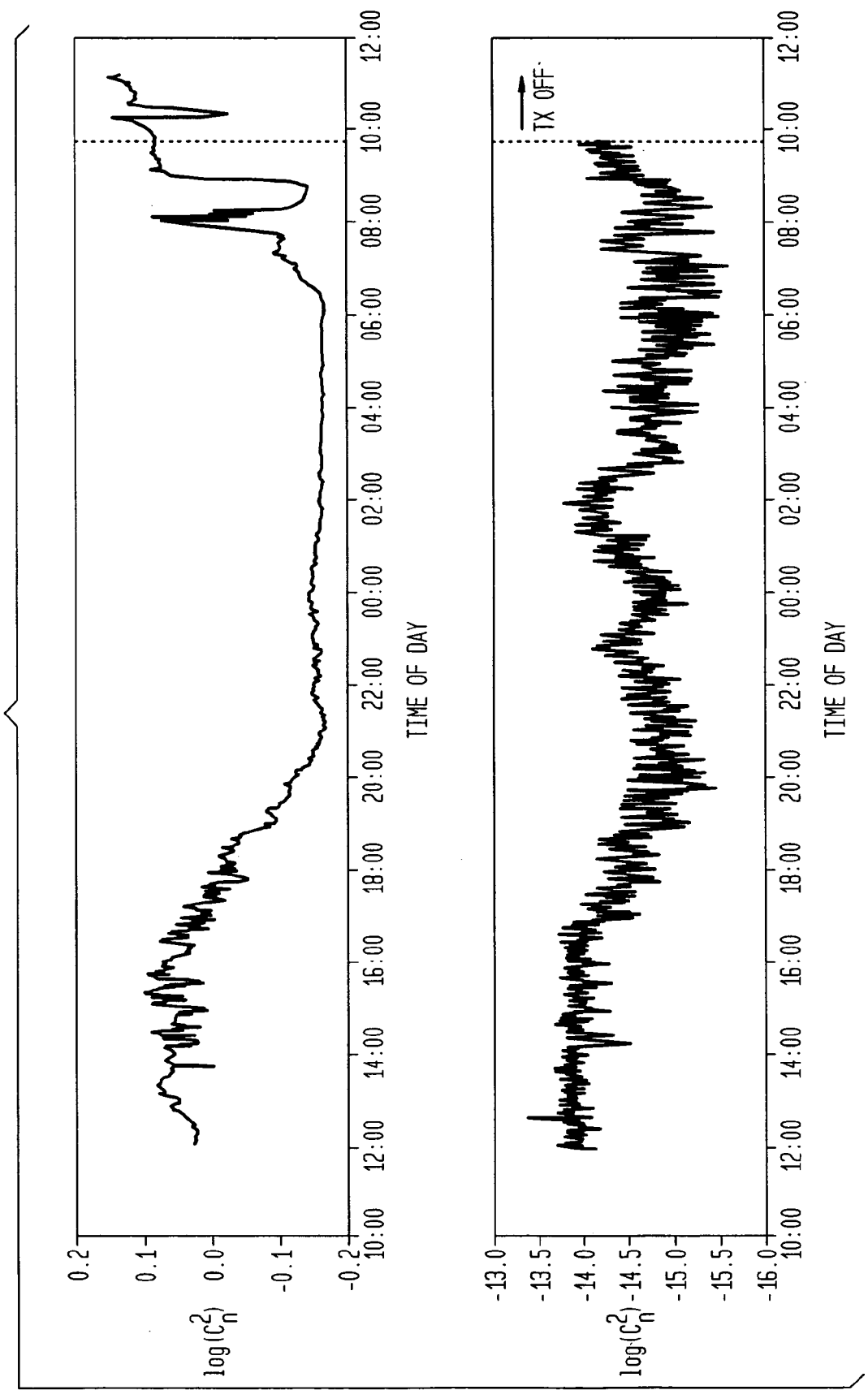
Figure 7K:
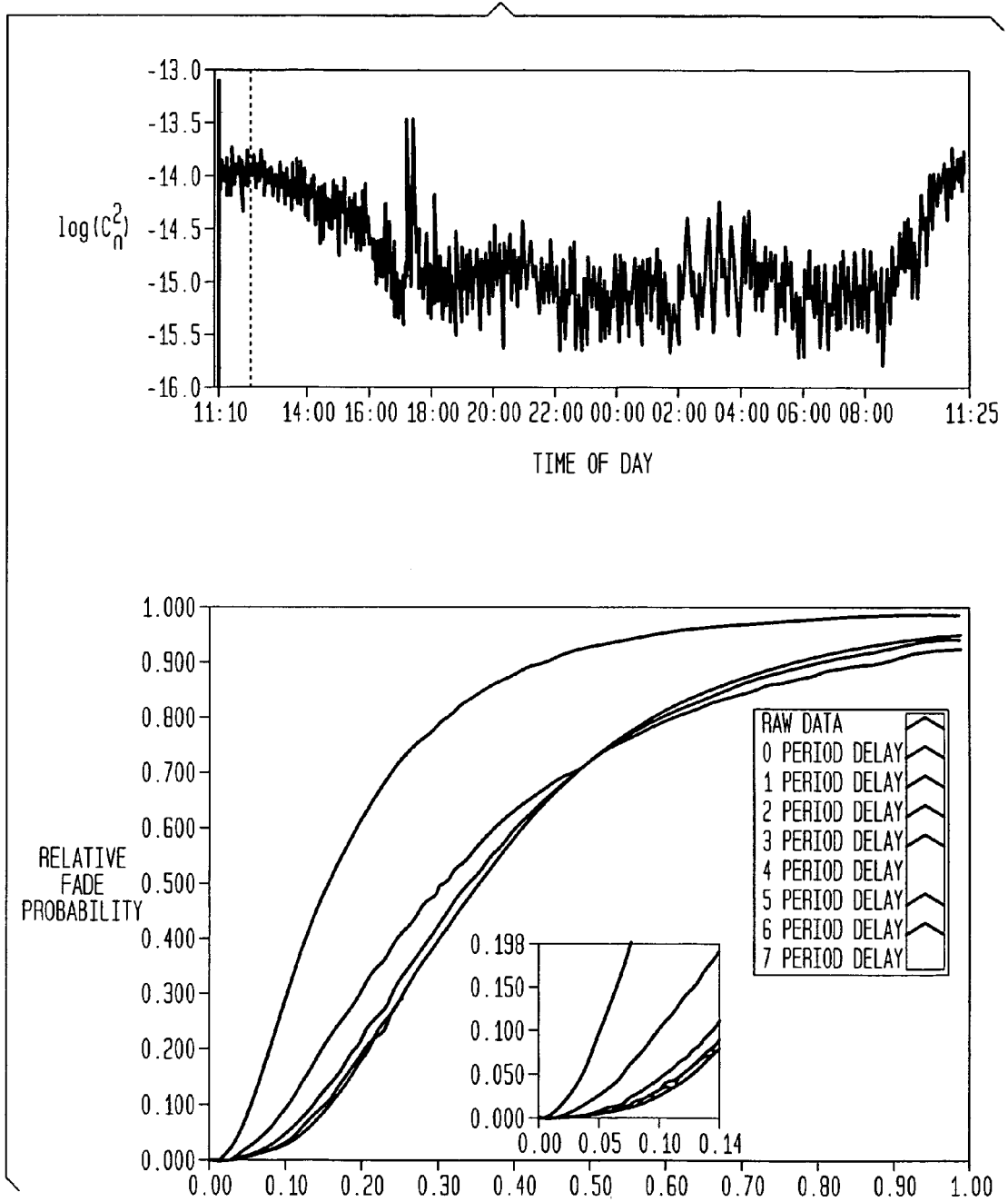
Figure 7L:
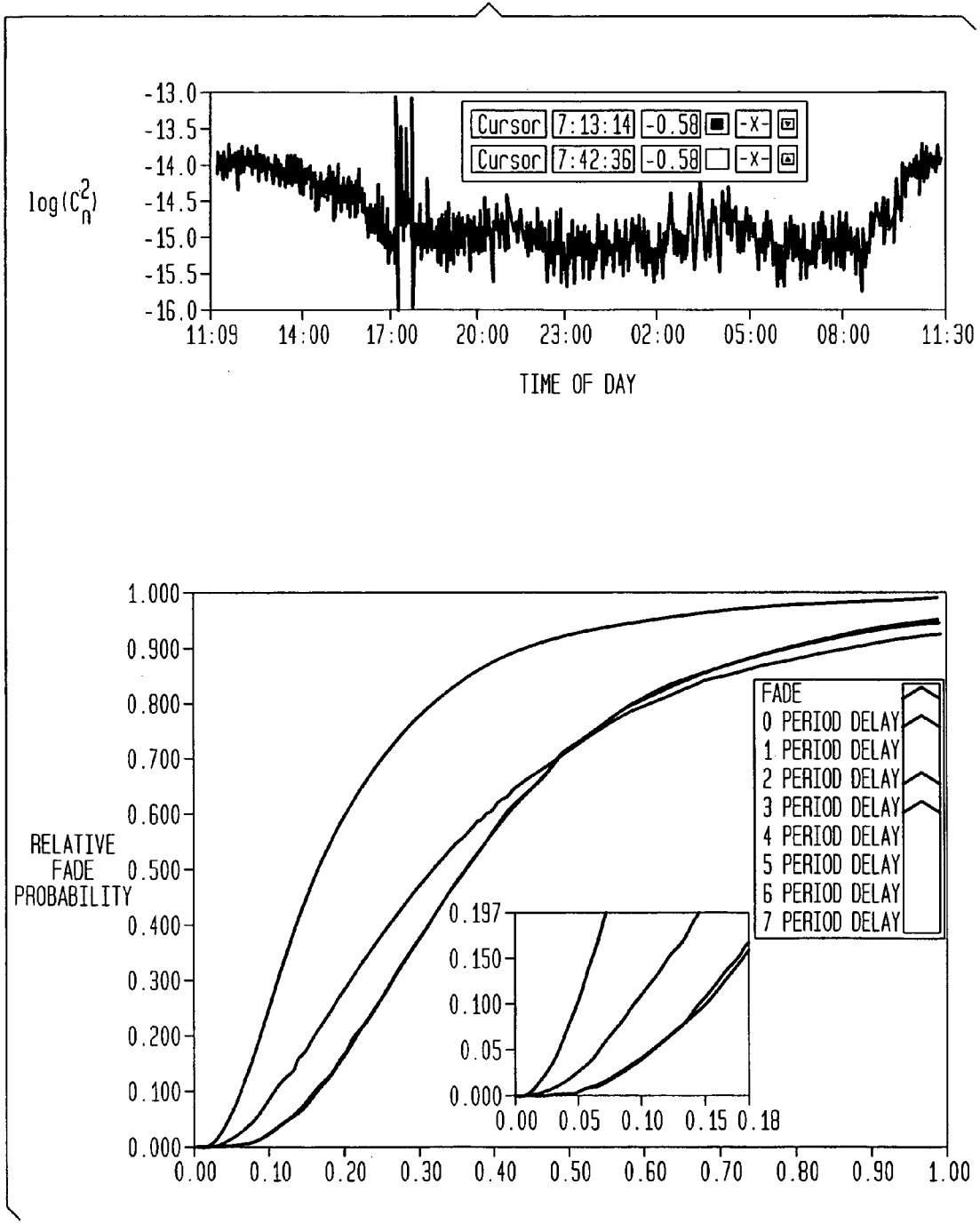
Figure 7M:
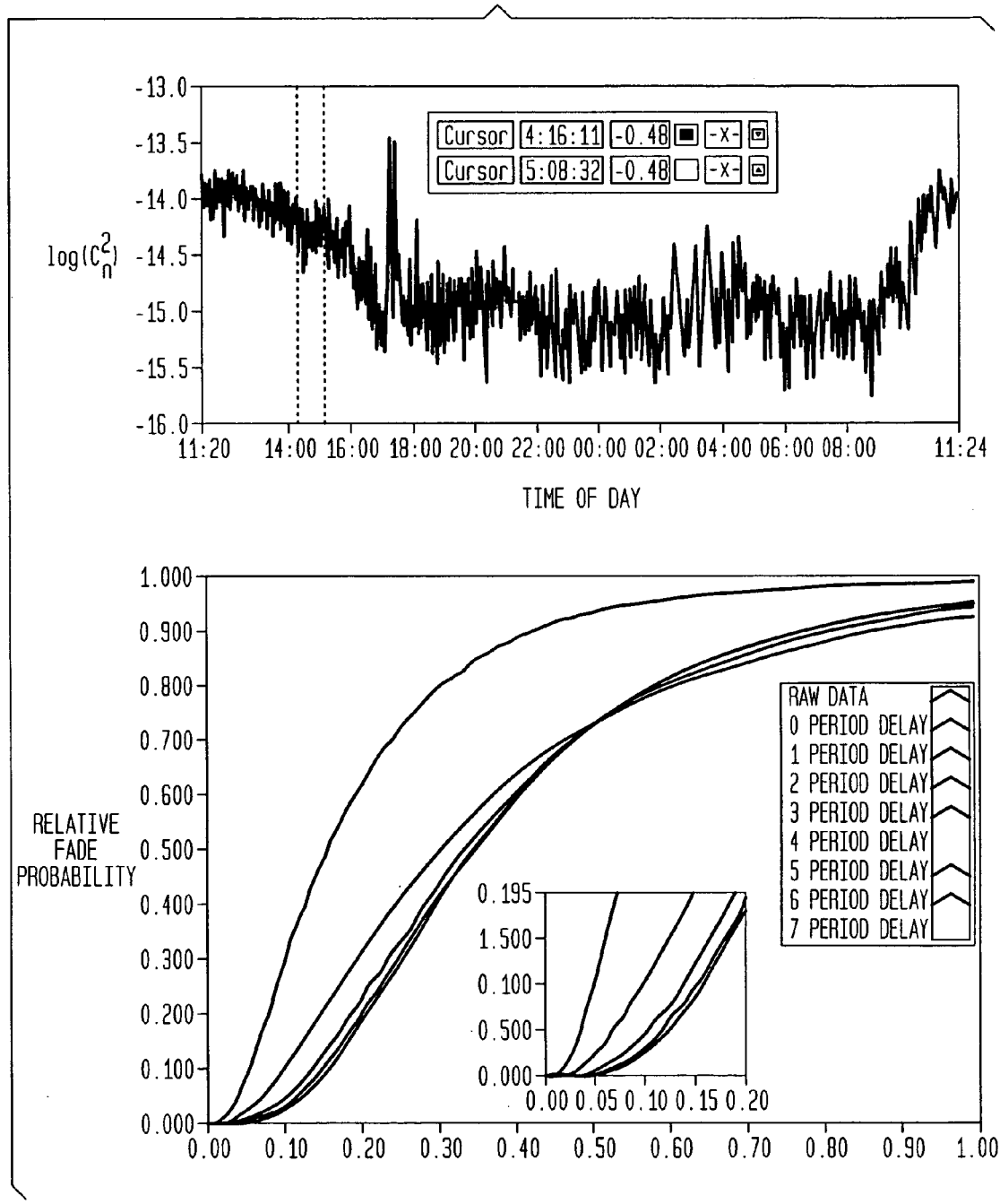
Figure 7N:
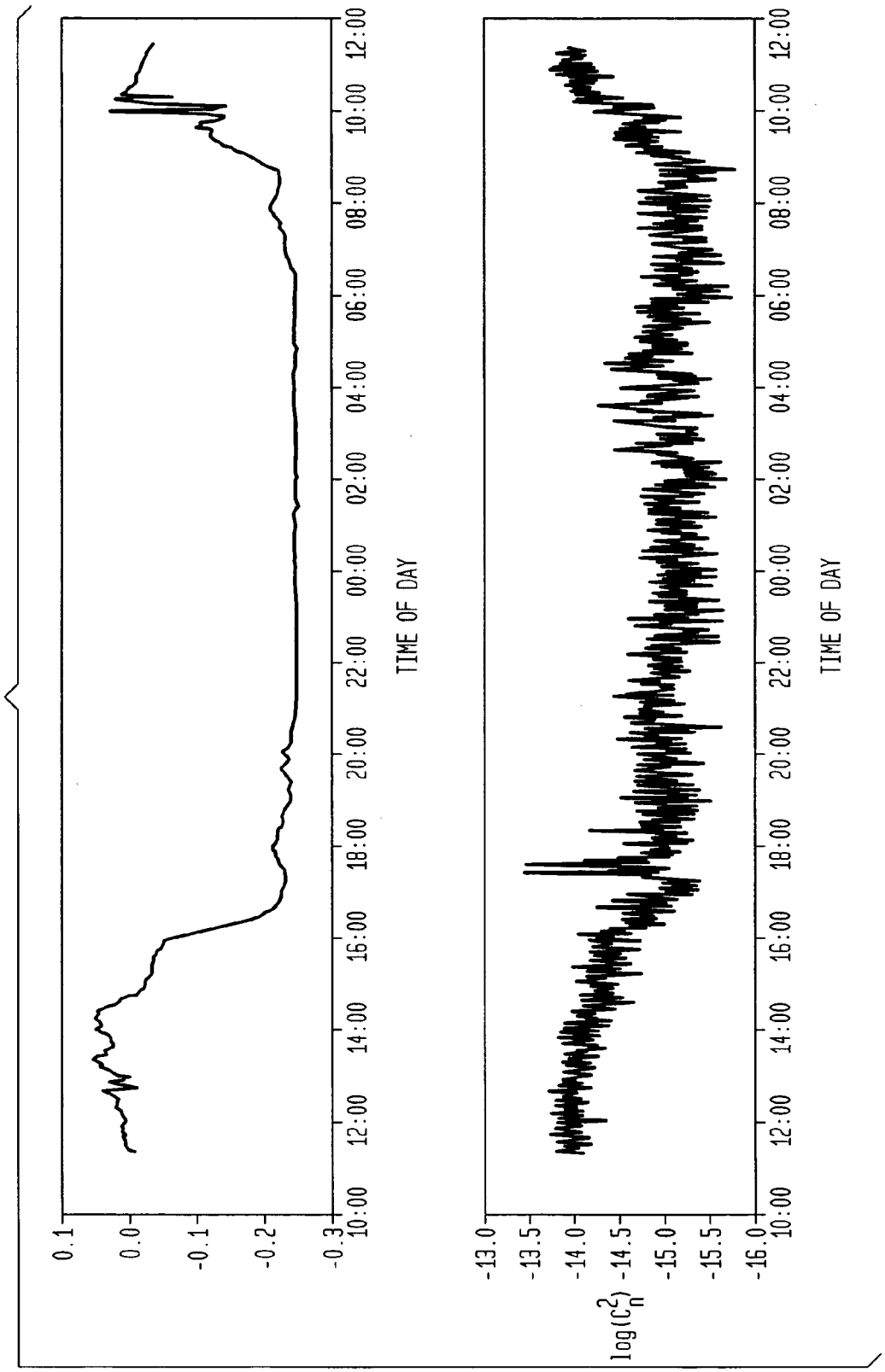
Figure 7P:
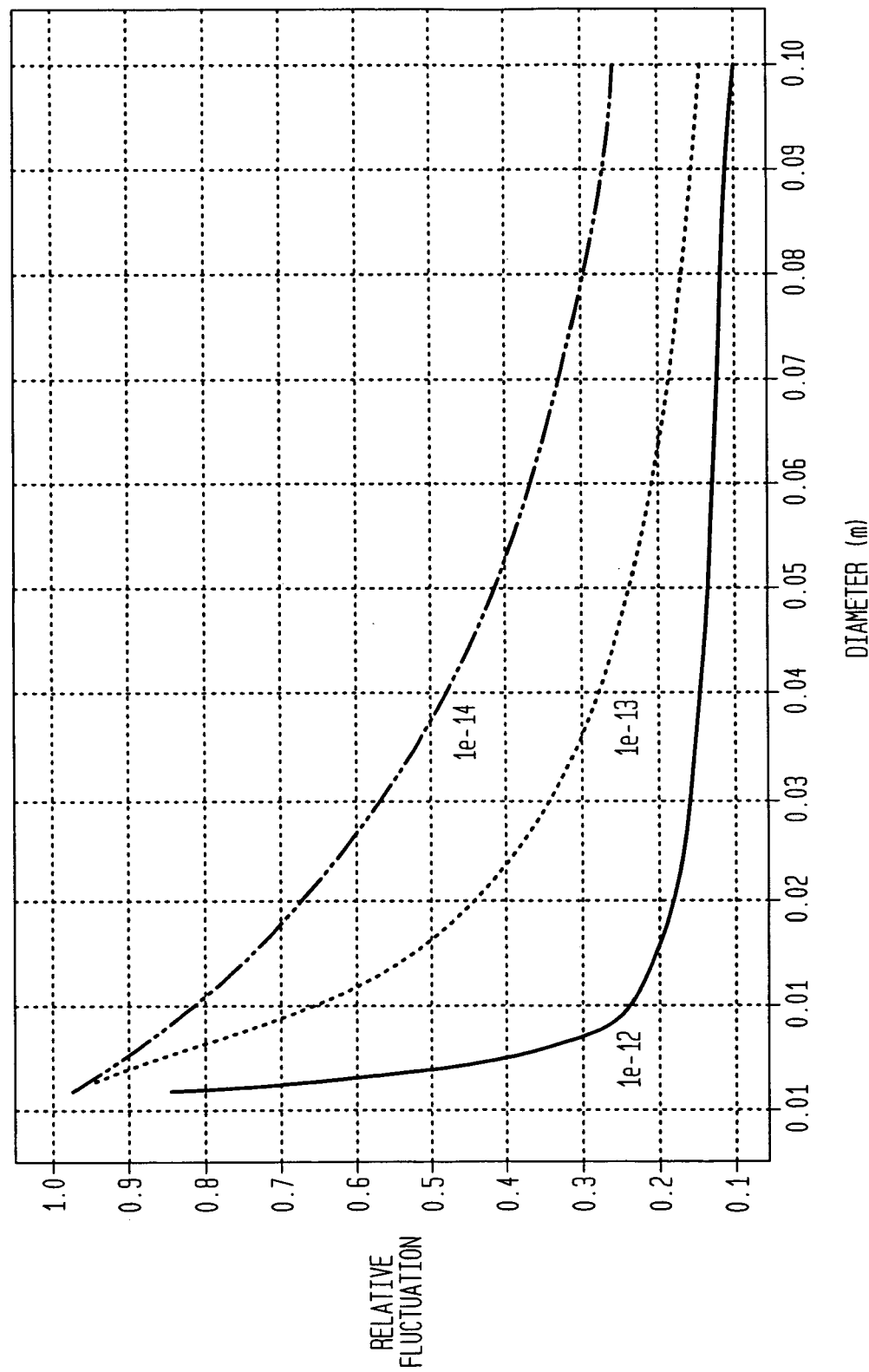

FIG. 7G shows experimental data from experiments carried out on the University of Maryland 1 km test range. A low frequency modulated bit stream was produced with a chopping wheel. Two orthogonally polarized beams were transmitted downrange and detected independently with a receiver system incorporating two photodiodes and a polarizing beam splitter. The receiver had an aperture of 30 mm. The laser beam was expanded at the transmitter to approximately 30 mm diameter, and was allowed to diverge as it propagated downrange. The beam diameter at the receiver was on the order of 2 m, which eliminated any need for beam steering or tracking. During the day the centroid of the received beam wandered about, either because of temperature variations, or because of some mechanical instability of the transmitter. The bit streams were analyzed numerically to compute the probability of error in each data stream independently, and then the delayed diversity improvement in the error rate was computed by comparing each odulated data stream with a delayed version of itself. It appears that, at least for the atmospheric conditions encountered, there is a significant reduction in error for time delays beyond 5 ms, but that there is not much further improvement as the delay is increased beyond 10 ms. FIGS. 7H–7N show additional data recorded at the University of Maryland test range. These data show both $C^2_n$ variations during the course of the day on various occasions, time varying background light levels, intensity histograms, and the consistent reduction in fading that can be achieved with the delayed diversity approach.

Aperture Averaging

In the practical operation of a line-of-sight communication link, a receiver will collect part of the wavefront that has been transmitted down range through the turbulent atmosphere. If the receiver has a small collection area then the variance of the intensity that it will see is determined by the range length L, and the turbulence level as discussed above. An assessment must be made for a given range/wavelength/$C^2_n$ scenario whether the turbulence is weak or strong, and then the expected intensity variance calculated. Or, this may be carried out in reverse: the intensity variance is measured, and then the performance of the link can be assessed. If the area of the receiver is increased, then the intensity variance decreases. This is to be expected, as in the limit, a sufficiently large detector will collect all the transmitted light, and no atmospheric turbulence induced intensity variations should be seen. The effect of the receiver size on the intensity variance is called aperture averaging. Tatarski has given an expression that allows the aperture averaging effect to be calculated from the correlation function $b_I(\rho)$ of the normalized intensity. His result is $$G(D) = \frac{16}{\pi D^2} \int_0^\infty \frac{b_I(\rho)}{b_I(0)} K(\rho) \rho \, d\rho, \quad (34)$$

where D is the diameter of the receiver aperture, and $$K(\rho) = \arccos(\rho/D) - (\rho/D)[1-(\rho^2/D^2)]^{1/2}. \quad (35)$$

G (D) represents the intensity variation seen with the actual receiver relative to a point receiver. In practice, at range L, a receiver whose diameter satisfies $D \ll \sqrt{\lambda L}$ will behave as a point receiver.

Aperture averaging reduces the intensity variance monotonically with increasing aperture size, but its actual effectiveness depends strongly on the strength of the turbulence. FIGS. (7O) and (7P) show aperture averaging calculations for the following optical link conditions: a 1.3 μm laser and a 1 km range. FIG. (7O) shows aperture averaging for three different degrees of "weak" turbulence, specified by the effective $C^2_n$ calculated from Eq. (9). FIG. (7P) shows aperture averaging for three different degrees of "strong" turbulence.

Note from FIG. (7O) that there are not significant differences in aperture averaging at this range under conditions of weak turbulence. At a receiver diameter of 65 mm the aperture averaging reduces the variance of the receive intensity by a factor of 10. This would cause a drastic reduction in the fractional fade characteristics of an optical link, as can be seen very easily from FIG. (7A). For example, without aperture averaging a 10 dB fade will occur about $10^{-4}$ of the time with an intensity variance of 0.3. With aperture averaging that reduces this variance to 0.03, the fractional time of a 10 dB fade falls to a totally negligible value. The curve corresponding to $C^2_n=10^{-13}$ in FIG. (7O) does not reflect the true aperture averaging that would occur, because this level of turbulence does not fall within the definition of "weak". For this level of turbulence FIG. (7P) is more appropriate, as these curves are calculated using the "strong" turbulence correlation function. For a $C^2_n$ value of $10^{-13}$ aperture averaging will reduce the intensity variance by a factor of 0.2 at a receiver diameter of approximately 65 mm. Note that as the turbulence becomes more severe, aperture averaging becomes more effective in reducing the intensity variance up to a point. Significant aperture averaging kicks in at very small receiver diameter, but there is a long tail. This is a practical manifestation of the so-called "salt and pepper" effect, in which strong turbulence scrambles the beam sufficiently that it becomes almost homogeneous and reduces the intensity variance. FIG. (7P) shows, for example, that for $C^2_n = 10^{-12}$ a factor of 5 aperture averaging results for a receiver diameter of only about 15 mm, but that a receiver diameter of about 100 mm is necessary for an aperture averaging factor of 10. It can be concluded that aperture averaging in both weak and strong turbulence, for the 1 km range and 1.3 μm wavelength considered here, can give a factor of 5 reduction in intensity variance for receiver diameters below about 45 mm, but that to achieve a factor of 10 might require a diameter as large as 100 mm. In general terms, in weak turbulence aperture averaging is quite effective for $D > \sqrt{\lambda L}$, while in strong turbulence it is quite effective for $D > 0.36\sqrt{\lambda L}(\sigma_{ln I_R}^2)^{-3/5}$ (See, Fante, R. W., *Proc. IEEE* 63:1669–1692 (1975)).

CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for optical wireless communication, comprising the steps of:
   receiving a source data signal having data;
   creating a set of temporally distinguishable transmission signals, the temporally distinguishable transmission signals being temporally separated from each other, such that a first temporally distinguishable transmission signal is temporally distinguished from a second temporally distinguishable transmission signal by a time-delay;
   converting the set of temporally distinguishable transmission signals to obtain a corresponding set of temporally and optically distinguishable light signals optically distinguished based on at least one of wavelength and polarization, each light signal having a modulation representation of the data from the source data signal; and
   transmitting the set of temporally and optically distinguishable light signals in a single output transmission beam through the Earth's atmosphere, wherein a duration of the time-delay is set based on characteristics of atmospheric turbulence to reduce bit errors in the transmitted temporally and optically distinguishable light signals.

2. The method of claim 1, wherein said set of temporally and optically distinguishable light signals comprise a set of delayed, diverse light signals, and wherein:
   said creating step comprises the steps of creating at least one duplicate of the source data signal and delaying the created duplicate signal to obtain the set of temporally distinguishable transmission signals having a non-delayed transmission signal and at least one delayed transmission signal; and
   said converting step comprises the step of generating a set of delayed, diverse light signals in response to the set of temporally distinguishable transmission signals, wherein the set of delayed, diverse light signals includes a first light signal corresponding to the non-delayed transmission signal and at least a second light signal corresponding to the at least one delayed transmission signal.

3. The method of claim 1, further comprising the steps of:
   receiving the single output transmission beam after it has passed through the Earth's atmosphere;
   detecting temporally distinguishable light signals within the received single output transmission beam to obtain corresponding temporally distinguishable data signals, such that a first temporally distinguishable data signal is temporally distinguished from a second temporally distinguishable data signal by the time delay;
   temporally adjusting at least the first temporally distinguishable data signal obtained in said detecting step; and
   logically combining each successive bit in the first temporally adjusted temporally distinguishable data signal with a corresponding successive bit in the second temporally distinguishable data signal to obtain each successive output bit in a single output data signal.

4. The method of claim 1, wherein the transmitting step comprises:
   transmitting the set of temporally and optically distinguishable light signals in a single output transmission beam through the Earth's atmosphere, wherein a duration of the time-delay is set based on characteristics of atmospheric turbulence to reduce bit errors in the transmitted temporally and optically distinguishable light signals, and wherein the duration of the time-delay is less than approximately 10 milliseconds.

5. A system for optical wireless communication, comprising:
   means for receiving a source data signal having data;
   means for creating a set of temporally distinguishable transmission signals, the temporally distinguishable transmission signals being temporally separated from each other, such that a first temporally distinguishable transmission signal is temporally distinguished from a second temporally distinguishable transmission signal by a time-delay;
   means for converting the set of temporally distinguishable transmission signals to obtain a corresponding set of temporally and optically distinguishable light signals optically distinguished based on at least one of wavelength and polarization, each light signal having a modulation representation of the data from the source data signal; and
   means for transmitting the set of temporally and optically distinguishable light signals in a single output transmission beam through the Earth's atmosphere, wherein a duration of the time-delay is set based on characteristics of atmospheric turbulence to reduce bit errors in the transmitted temporally and optically distinguishable light signals.

6. The system of claim 5, wherein said set of temporally and optically distinguishable light signals comprise a set of delayed, diverse light signals, and wherein:
   said creating means comprises means for creating at least one duplicate of the source data signal and delaying the created duplicate signal to obtain the set of temporally distinguishable transmission signals having a non-delayed transmission signal and at least one delayed transmission signal; and said converting means comprises means for generating a set of delayed, diverse light signals in response to the set of temporally distinguishable transmission signals, wherein the set of delayed, diverse light signals includes a first light signal corresponding to the non-delayed transmission signal and at least a second light signal corresponding to the at least one delayed transmission signal.

7. The system of claim 5, further comprising:

means for receiving the single output transmission beam after it has passed through the Earth's atmosphere;

means for detecting temporally distinguishable light signals within the received single output transmission beam to obtain corresponding temporally distinguishable data signals, such that a first temporally distinguishable data signal is temporally distinguished from a second temporally distinguishable data signal by the time delay;

means for temporally adjusting at least the first temporally distinguishable data signal obtained in said detecting step; and means for logically combining each successive bit in the first temporally adjusted temporally distinguishable data signal with a corresponding successive bit in the second temporally distinguishable data signal to obtain each successive output bit in a single output data signal.

8. The system of claim 5, wherein the duration of the time-delay is less than approximately 10 milliseconds.

9. An apparatus for optical wireless communications, comprising:

a data source that provides a first set of data signals that are identical;

a data delay device that delays a data signal in the first set of data signals to produce a second set of temporally distinguishable data signals, wherein the temporally distinguishable data signals in the second set are temporally separated from each other such that a first temporally distinguishable data signal is temporally distinguished from a second temporally distinguishable data signal by a time-delay;

a set of converters that convert the second set of temporally distinguishable data signals to produce a first set of temporally and optically distinguishable optical signals optically distinguished based on at least one of wavelength and polarization, each optical signal in the set of temporally and optically distinguishable optical signals having a modulation representation of the data from the data source; and at least one optical-signal-combining device that combines the set of temporally distinguishable optical signals into a single output beam for transmission through the Earth's atmosphere, wherein a duration of the time-delay is set based on characteristics of atmospheric turbulence to reduce bit errors caused by fading.

10. The system of claim 9, further comprising:

a receiver that receives the single output beam after it is transmitted through the Earth's atmosphere, comprising:

at least one optical-signal-separating device that separates the single output beam, based on at least one of wavelength and polarization, into a second set of temporally distinguishable optical signals, a set of detectors, each detector configured to receive a respective optical signal from the second set of temporally distinguishable optical signals and convert the respective optical signal into a received data signal, thereby producing a received-set of temporally distinguishable data signals, at least one receiver-data-delay device that temporally aligns the received-set of temporally distinguishable data signals, thereby producing a final set of data signals, and a logic gate that receives the final set of data signals, and that logically combines (i) each successive bit in a first data signal in the final set of data signals and (ii) a corresponding successive bit in a second data signal in the final set of data signals, to obtain each successive bit of an output data signal.

11. The system of claim 9, wherein the duration of the time-delay is less than approximately 10 milliseconds.

12. The system of claim 9, wherein the set of converters includes a set of polarizing elements that polarize a first optical signal in the first set of temporally and optically distinguishable optical signals in a first direction and a second optical signal in the first set of temporally and optically distinguishable optical signals in a second direction different from the first direction.

13. The system of claim 9, wherein the set of converters comprises a set of lasers that convert the second set of temporally distinguishable data signals to produce a first set of temporally and optically distinguishable optical signals, such that a first optical signal in the first set of temporally and optically distinguishable optical signals has a first wavelength and a second optical signal in the first set of temporally and optically distinguishable optical signals has a second wavelength different from the first wavelength.

14. The system of claim 13, wherein the set of converters includes a set of polarizing elements that polarize a first optical signal in the first set of temporally and optically distinguishable optical signals in a first direction and a second optical signal in the first set of temporally and optically distinguishable optical signals in a second direction different from the first direction.

* * * * *